United States Patent
Wang et al.

(10) Patent No.: US 12,128,901 B2
(45) Date of Patent: Oct. 29, 2024

(54) VIRTUALIZED DRIVER ASSISTANCE

(71) Applicant: Toyota Jidosha Kabushiki Kaisha, Toyota (JP)

(72) Inventors: Ziran Wang, Riverside, CA (US); BaekGyu Kim, Cupertino, CA (US); Hiromitsu Kobayashi, Sunnyvale, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 17 days.

(21) Appl. No.: 18/045,407

(22) Filed: Oct. 10, 2022

(65) Prior Publication Data

US 2023/0166734 A1 Jun. 1, 2023

Related U.S. Application Data

(63) Continuation of application No. 16/268,729, filed on Feb. 6, 2019, now Pat. No. 11,465,626.

(51) Int. Cl.
| | | |
|---|---|---|
| *B60W 30/18* | (2012.01) | |
| *B60W 50/14* | (2020.01) | |
| *G02B 27/01* | (2006.01) | |
| *H04W 4/02* | (2018.01) | |
| *H04W 4/46* | (2018.01) | |

(52) U.S. Cl.
CPC ...... *B60W 30/18163* (2013.01); *B60W 50/14* (2013.01); *G02B 27/01* (2013.01); *H04W 4/46* (2018.02); *B60W 2050/146* (2013.01)

(58) Field of Classification Search
CPC .......... B60W 30/18163; B60W 50/14; B60W 2050/146; G02B 27/01; H04W 4/46
USPC .......................................................... 701/25
See application file for complete search history.

(56) References Cited

U.S. PATENT DOCUMENTS

| | | |
|---|---|---|
| 5,761,630 A | 6/1998 | Sekine et al. |
| 8,788,134 B1 | 7/2014 | Litkouhi et al. |
| 8,810,431 B2 | 8/2014 | Mudalige et al. |

(Continued)

FOREIGN PATENT DOCUMENTS

| | | |
|---|---|---|
| CN | 102336191 B | 4/2014 |
| JP | 4830621 B2 * | 12/2011 |

OTHER PUBLICATIONS

Android Mediafire, "iOnRoad Augmented Driving Pro v2.0.1p Mod Full APK [Latest]," retrieved from http://androidmediafire.blogspot.com/2016/01/ionroad-augmented-driving-pro-v201p-mod.html, Jan. 18, 2016, 5 pgs.

(Continued)

*Primary Examiner* — Abby Y Lin
*Assistant Examiner* — Hossam M Abd El Latif
(74) *Attorney, Agent, or Firm* — VLP Law Group LLP; Michel Bohn

(57) ABSTRACT

In an example, a method determines a reference vehicle traveling in a first lane. The first lane merges with a second lane at a merging point. The method can determine a merging plan for a merging vehicle traveling in the second lane to merge into the first lane based on a vehicle position, and in some cases the speed, of the reference vehicle in the first lane. The method can overlay, via a display device, a virtual target in a field of view of a roadway environment of a driver of the merging vehicle based on the merging plan of the merging vehicle.

20 Claims, 13 Drawing Sheets

(56) References Cited

U.S. PATENT DOCUMENTS

| | | | |
|---|---|---|---|
| 2012/0283942 A1* | 11/2012 | T'Siobbel | G01C 21/26 701/410 |
| 2017/0291608 A1* | 10/2017 | Engel | B60W 30/18163 |
| 2017/0305422 A1* | 10/2017 | Ito | B60W 50/0097 |
| 2017/0369055 A1* | 12/2017 | Saigusa | G08G 1/096775 |
| 2018/0129206 A1* | 5/2018 | Harada | B60W 50/082 |
| 2018/0194363 A1* | 7/2018 | Sugiura | B60W 50/0098 |
| 2018/0222491 A1 | 8/2018 | Miyahara et al. | |
| 2019/0088137 A1 | 3/2019 | Yamada et al. | |
| 2020/0097073 A1 | 3/2020 | Lyren et al. | |
| 2020/0339147 A1 | 10/2020 | Hayakawa et al. | |

OTHER PUBLICATIONS bashy.net, "The indicator on the car windshield," retrieved from https://bashny.net/t/en/297822, at least as early as Oct. 15, 2018, 5 pgs.

Kore, "Augmented and Virtual Reality displays," retrieved from https://hackernoon.com/displays-for-augmented-and-virtual-reality-2d77b5199a8b, at least as early as Oct. 7, 2018, 7 pgs.

Nazarian, "Hands on with iOnRoad, Turn your smartphone into a your personal driving assistant," retrieved from https://www.talkandroid.com/110606-hands-on-with-ionroad-turn-your-smartphone-into-a-your-personal-driving-assistant/, May 9, 2012, 5 pgs.

Neiger, "How Head-up Displays Work," retrieved from https://auto.howstuffworks.com/car-driving-safety/safety-regulatory-devices/head-up-display3.htm, at least as early as Oct. 15, 2018, 4 pgs.

Rolland, "AR/VR Displays: Engineering the ultimate augmented reality display: Paths towards a digital window into the world," retrieved from https://www.laserfocusworld.com/articles/print/volume-54/issue-06/features/ar-vr-displays-engineering-the-ultimate-augmented-reality-display-paths-towards-a-digital-window-into-the-world.html, Jun. 1, 2018, 12 pgs.

Valeo, "Head-up display: the best solution to limit driver distraction," retrieved from https://twitter.com/valeo_group/status/887318543213232128?lang=bg, at least as early as Oct. 15, 2018, 2 pgs.

Wikipedia, "Augmented reality," retrieved from https://en.wikipedia.org/wiki/Augmented_reality, Oct. 18, 2018, 37 pgs.

* cited by examiner

VIRTUALIZED DRIVER ASSISTANCE

BACKGROUND

The present disclosure relates to driver assistance system. In a more particular example, the disclosure relates to technologies for providing virtualized driver assistance.

Driving often requires complex cooperation between vehicles. As an example, when merging onto a freeway, the vehicles entering the roadway, such as those on the entrance ramp, must yield and adapt their vehicle movement in order to merge onto the freeway safely without endangering the other vehicles on the roadway. On the other hand, the freeway vehicles must be aware of merging traffic and be ready to adjust their vehicle movement to avoid a potential collision with the merging vehicles.

Coordination between vehicles is often made difficult due to vehicle blind spots, vehicle position, roadway obstructions, construction, weather, and other interference. For example, merging vehicles must consider vehicles that may be behind, to the side, and in front of them, thus requiring drivers to repeatedly and awkwardly look over their shoulders, to the side of their vehicles and forward in an attempt to identify all potential hazards during the merge. While burdensome for most drivers, those with a limited range of motion have an even more difficult time assessing their surroundings. Further, roadway geometry and obstructions, such as the height difference between the freeway and the entrance ramp, roadway barriers, and line-of-sight obstacles (e.g., signs, trees, etc.) can further limit the drivers' vision. As a further example, some traffic interchanges may have a short distance between the entrance ramp and the exit ramp (e.g., cloverleaf interchanges, etc.). Merging vehicles entering an existing the freeway using these interchanges are exposed to an even greater risk of an accident because the time to perform the merging maneuver is even more constrained and the stress of performing the maneuver is even more pronounced.

While some modern systems exist that attempt to ease the burden of maneuvering a vehicle in traffic, they have significant deficiencies. Some solutions, like a warning light indicator embedded in a side view mirror of a merging vehicle that lights up when an adjacent vehicle is positioned in the blind spot of the merging vehicle, are insufficient because the sonar or radar sensors of the vehicle being used to sense whether a car is located in the blind spot only work once the vehicle is very close by (e.g., within a meter or two) and do not work reliably in inclement weather. These systems also do not consider the traffic toward the front of the vehicle, nor do they consider potential changes in the environment such as approaching traffic, traffic merging from other directions, roadway geometry, potential changes that could immediately occur, etc. As a result, while these systems can generally only help the driver to tell if a vehicle is located immediately in the blind spot of the vehicle, and provide no instruction on what to actually do with the information, which is of limited value.

Other solutions rely on in-dash navigation units and generic traffic data that lack the fidelity to identify what vehicles are surrounding a subject vehicle at a given time. As such, these solutions are not reliable enough to provide highly accurate and time-critical instructions during the merging process. They also require a lot of driver interpretation and are displayed in a location where the driver cannot see the information when looking straight.

SUMMARY

The novel driver assistance technology described in this disclosure overcomes the deficiencies and limitations of existing solutions.

According to one innovative aspect of the subject matter described in this disclosure, a computer-implemented method comprises: determining a reference vehicle travelling in a first lane, the first lane merging with a second lane at a merging point; determining a merging plan for a merging vehicle travelling in the second lane to merge into the first lane based on a vehicle position of the reference vehicle in the first lane; and overlaying, via a display device, a virtual target in a field of view of a roadway environment of a driver of the merging vehicle based on the merging plan of the merging vehicle.

In general, another innovative aspect of the subject matter described in this disclosure may be embodied in computer-implemented methods comprising: determining a reference vehicle travelling in a first lane, the first lane merging with a second lane at a merging point; determining a merging plan for a first merging vehicle travelling in the second lane to merge into the first lane based on a vehicle position of the reference vehicle in the first lane; overlaying, via a first display device, a first virtual target in a field of view of a roadway environment of a driver of the first merging vehicle based on the merging plan of the first merging vehicle; determining a second merging vehicle travelling in the second lane; determining a merging plan for the reference vehicle to merge with the second merging vehicle as the second merging vehicle merges into the first lane based on a vehicle position of the second merging vehicle in the second lane; and overlaying, via a second display device, a second virtual target in a field of view of the roadway environment of a driver of the reference vehicle based on the merging plan of the reference vehicle.

In general, another innovative aspect of the subject matter described in this disclosure may be embodied in systems comprising: one or more processors; one or more memories storing instructions that, when executed by the one or more processors, cause the system to: determine a reference vehicle travelling in a first lane, the first lane merging with a second lane at a merging point; determine a merging plan for a merging vehicle travelling in the second lane to merge into the first lane based on a vehicle position of the reference vehicle in the first lane; and overlay, via a display device, a virtual target in a field of view of a roadway environment of a driver of the merging vehicle based on the merging plan of the merging vehicle.

These and other implementations may each optionally include one or more of the following features: that the display device is a head-up display unit; that determining the merging plan includes determining a simulated position for the reference vehicle in the second lane ahead of the merging vehicle in the second lane based on the vehicle position of the reference vehicle in the first lane, and overlaying the virtual target in the field of view includes rendering the virtual target in the field of view at a display position that is based on the simulated position of the reference vehicle; that overlaying the virtual target in the field of view includes determining the display position of the virtual target in the field of view based on the simulated position of the reference vehicle and one or more roadway attributes of the second lane, and rendering the virtual target at the display position in the field of view; that determining a position range for the merging vehicle in the second lane based on the simulated position of the reference vehicle in the second lane, and overlaying a virtual position indicator indicating the position range for the merging vehicle in the field of view; that determining the simulated position of the reference vehicle in the second lane includes receiving vehicle movement data of the reference vehicle in the first lane, receiving vehicle movement data of the merging vehicle in the second lane, receiving roadway data describing the first lane and second lane, and determining the simulated position of the reference vehicle in the second lane based on the vehicle movement data of the reference vehicle in the first lane, the vehicle movement data of the merging vehicle in the second lane, and the roadway data; that receiving driving behavior data associated with a driver of the reference vehicle, receiving sensor data captured by one or more sensors of the merging vehicle, and adjusting the simulated position of the reference vehicle in the second lane based on the driving behavior data associated with the driver of the reference vehicle and the sensor data of the merging vehicle; that the field of view of the roadway environment includes a front field of view and a side field of view associated with the driver of the merging vehicle, overlaying the virtual target in the field of view includes rendering the virtual target on a front display surface, the front display surface covering at least a portion of a windshield of the merging vehicle that is within the front field of view, and overlaying a safety information indicator in the field of view, the safety information indicator being rendered on a side display surface, the side display surface covering at least a portion of a side window or a portion of a side mirror of the merging vehicle that is within the side field of view; that determining the reference vehicle travelling in the first lane includes estimating one or more merging timestamps at which one or more vehicles travelling in the first lane and the second lane arrive at the merging point, the one or more estimated merging timestamps including an estimated merging timestamp of the merging vehicle, and determining the reference vehicle from the one or more vehicles based on the estimated merging timestamp of the merging vehicle; that determining the reference vehicle from the one or more vehicles includes determining a first merging timestamp that has a lowest time distance prior to the estimated merging timestamp of the merging vehicle among the one or more estimated merging timestamps, and determining the reference vehicle based on the first merging timestamp; that monitoring the one or more vehicles travelling in the first lane and the second lane, updating the one or more estimated merging timestamps at which the one or more vehicles arrive at the merging point, determining a different reference vehicle travelling in the first lane based on the one or more updated estimated merging timestamps of the one or more vehicles, responsive to determining the different reference vehicle travelling in the first lane, updating the merging plan of the merging vehicle based on a vehicle position of the different reference vehicle in the first lane, and adjusting the virtual target overlaid in the field of view based on the updated merging plan of the merging vehicle; that the first lane is on a freeway and the second lane is on a ramp segment of the freeway.

These and other implementations may each optionally include one or more of the following features: that estimating one or more merging timestamps at which one or more vehicles traveling in the first lane and the second lane arrive at the merging point, determining the reference vehicle from the one or more vehicles based on an estimated merging timestamp of the first merging vehicle among the one or more estimated merging timestamps, and determining the second merging vehicle from the one or more vehicles based on an estimated merging timestamp of the reference vehicle among the one or more estimated merging timestamps.

Other implementations of one or more of these and other aspects include corresponding systems, apparatus, and computer programs, configured to perform the actions of methods, encoded on non-transitory computer storage devices.

The novel technology for providing driver assistance to drivers presented in this disclosure is particularly advantageous in a number of respects. For example, the technology described herein enables the drivers to adjust the vehicle movement of their vehicles early in the merging process, thereby enabling the vehicles to smoothly merge with one another and reducing the risk of collision in the merging zone. As a further example, the present technology can provide the assistance information in a perceptive and practical format in the field of view of the driver (e.g., a virtual target to follow, a virtual position indicator to position the vehicle, etc.). Thus, the assistance information can significantly improve the driving experience of the driver without distracting the attention of the driver from the road and increasing the likelihood of traffic accident. In addition to the merging assistance information that facilitates the merging process, the technology described herein can also provide hazard assistance information that indicates potential hazards caused by proximate vehicles for the driver to adapt accordingly. Furthermore, the present technology can rely on data transmitted via vehicle-to-vehicle (V2V) communication and vehicle-to-infrastructure (V2I) communication to provide the driver assistance to the driver. As a result, the reliability of the present technology may not be affected by the accuracy of object detection techniques and the negative impacts of the surrounding environment (e.g., weather condition, lighting condition, etc.).

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

DESCRIPTION

The technology described herein can provide an augmented driver experience to efficiently and effectively facilitate performance by the driver of a smooth merging process and improve the driving experience of the driver. As described in further detail below, the technology includes various aspects, such as driver assistance methods, systems, computing devices, computer program products, and apparatuses, among other aspects.

An example virtualized driver assistance system can determine a reference vehicle traveling in a first lane, and determine a merging plan for a merging vehicle traveling in a second lane based on one or more criteria, such as the vehicle position of the reference vehicle in the first lane and/or the speed of the reference vehicle in the first lane. In some cases, the reference vehicle could be ahead, to the left or right of, or behind the merging vehicle.

To assist the driver of the merging vehicle with merging from the second lane to the first lane, the virtualized driver assistance system can augment the driver's actual roadway view by overlaying a virtual target in the field of view of the driver of the merging vehicle based on the merging plan of the merging vehicle. Thus, the driver can adjust the vehicle movement of the merging vehicle according to the virtual target in the field of view as the merging vehicle proceeds towards the merging point between the first lane and the second lane. As the merging vehicle reaches the merging point, the vehicle movement of the merging vehicle (e.g., vehicle speed, vehicle position, etc.) is appropriately adjusted in advance and therefore, the merging vehicle is ready to smoothly merge with the reference vehicle in the first lane without abrupt adaptation at the last minute, thereby significantly reducing the risk of traffic accidents. In addition, the virtualized driver assistance system can also overlay hazard assistance information (e.g., collision metrics, blind spot alert, etc.) in the field of view to inform the driver of potential hazards caused by proximate vehicles, thereby enabling the driver to timely react as necessary.

Figure 1:
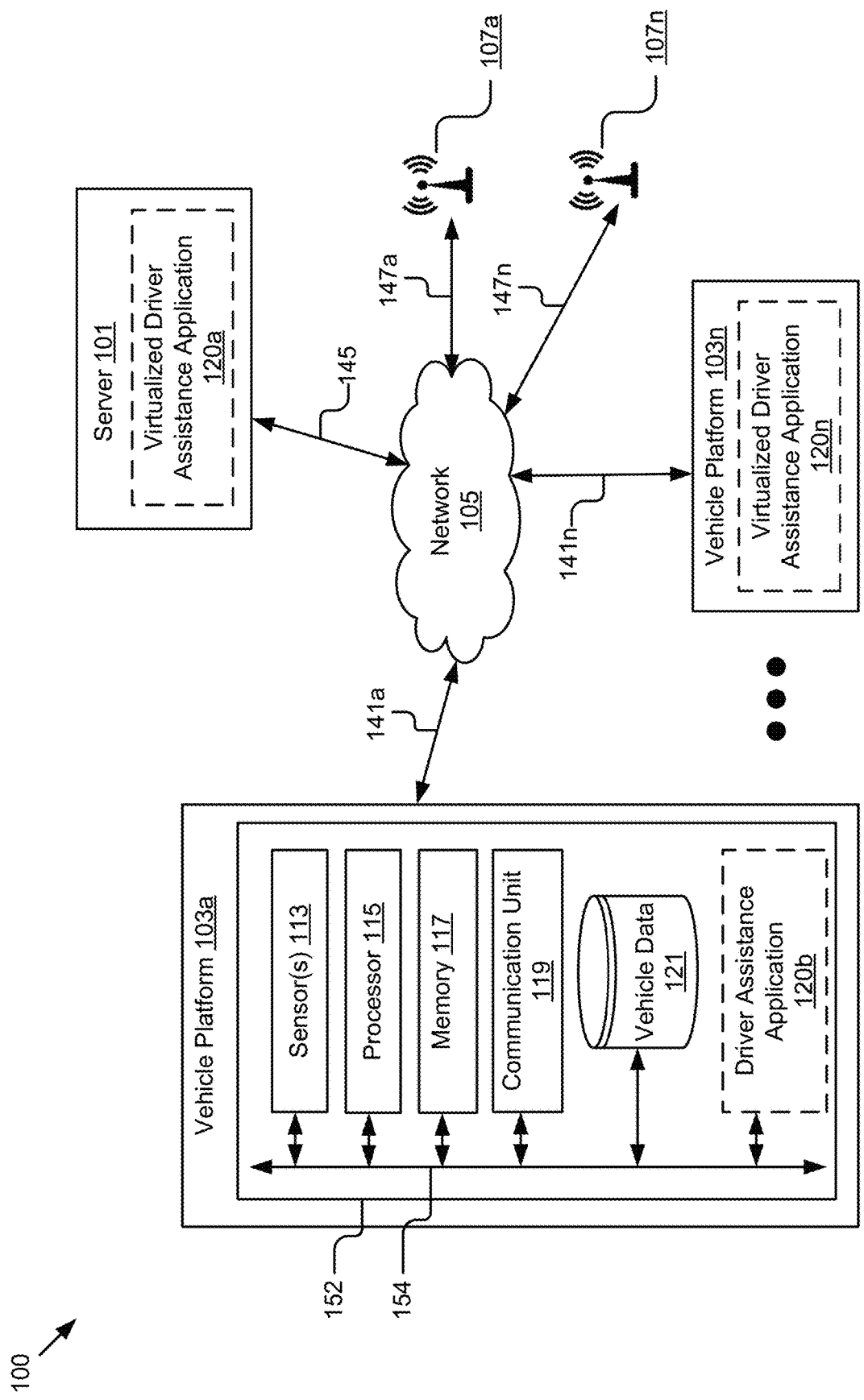
FIG. 1 is a block diagram of an example system for providing virtualized driver assistance.

FIG. 1 is a block diagram of an example system 100 for providing virtualized driver assistance. As shown, the system 100 includes a server 101, one or more vehicle platforms 103a . . . 103n, and one or more roadside unit 107a . . . 107n coupled for electronic communication via a network 105. In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of vehicle platforms 103, roadside units 107, networks 105, or servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near-field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 may be a wireless network using a connection such as DSRC (Dedicated Short Range Communication), WAVE, 802.11p, a 3G, 4G, 5G+ network, WiFi™ satellite networks, vehicle-to-vehicle (V2V) networks, vehicle-to-infrastructure/infrastructure-to-vehicle (V2I/I2V) networks, vehicle-to-infrastructure/vehicle-to-everything (V2I/V2X) networks, or any other wireless networks. Although FIG. 1 illustrates a single block for the network 105 that couples to the server 101, the roadside unit(s) 107, and the vehicle platform(s) 103, it should be understood that the network 105 may in practice comprise any number of combination of networks, as noted above.

The server 101 includes a hardware and/or virtual server that includes a processor, a memory, and network communication capabilities (e.g., a communication unit). In some embodiments, the server 101 may have larger computing capabilities and computing resources than other entities of the system 100 (e.g., the vehicle platforms 103, the roadside units 107). The server 101 may be communicatively coupled to the network 105, as reflected by signal line 145. In some embodiments, the server 101 may send and receive data to and from other entities of the system 100, e.g., one or more vehicle platforms 103, one or more roadside units 107. As depicted, the server 101 may include an instance of the virtualized driver assistance application 120.

The roadside unit 107 may include a hardware and/or virtual device that includes a processor, a memory, and network communication capabilities (e.g., a communication unit). The roadside unit 107 may be communicatively coupled to the network 105, as reflected by signal line 147. In some embodiments, the roadside unit 107 may be an infrastructure located on the roadside of a conflict area in a merging zone. A merging zone may include a first lane that merges with a second lane at a merging point, an intersection where the vehicles make right or left-hand turns to merge with through traffic, or any other point of convergence where the vehicles merge into the same traffic flow. A conflict area in the merging zone may be the area of the merging zone in which the vehicles likely shift to a particular lane (e.g., the most right lane) and therefore likely target the same opening space in that particular lane or likely cross paths with other vehicles due to the lane changes. In some embodiments, the roadside unit 107 may be configured to monitor the vehicle platforms 103 traveling in one or more specific lanes of the merging zone, and transmit data to and/or receive data from these vehicle platforms 103. In some embodiments, the roadside unit 107 may transmit the data received from these vehicle platforms 103 to other entities of the system 100 (e.g., other roadside unit(s) 107 and/or the server 101).

The vehicle platform(s) 103 include computing device(s) 152 having sensor(s) 113, processor(s) 115, memory(ies) 117, communication unit(s) 119, a vehicle data store 121, and an instance of the virtualized driver assistance application 120. Examples of computing device(s) 152 may include virtual or physical computer processors, control units, micro-controllers, etc., which are coupled to other components of the vehicle platform(s) 103, such as one or more sensors 113, actuators, motivators, etc. The vehicle platform(s) 103 may be coupled to the network 105 via signal line 141 and may send and receive data to and from other vehicle platform(s) 103, the roadside unit(s) 107, and/or the server(s) 101. In some embodiments, the vehicle platform(s) 103 are capable of transporting from one point to another. Non-limiting examples of the vehicle platform(s) 103 include a vehicle, an automobile, a bus, a boat, a plane, a bionic implant, a robot, or any other platforms with non-transitory computer electronics (e.g., a processor, a memory, or any combination of non-transitory computer electronics). The vehicle platform(s) 103 may be referred to herein as vehicle(s).

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the vehicle platform 103, the processor may be an electronic control unit (ECU) implemented in the vehicle platform 103 such as a car, although other types of platform are also possible and contemplated. The ECUs may receive and store the sensor data as vehicle operation data in the vehicle data store 121 for access and/or retrieval by the virtualized driver assistance application 120. In some implementations, the processor(s) 115 may be capable of generating and providing electronic display signals to input/output device(s), capturing and transmitting images, supporting the display of virtual objects incorporated into the field of view of the driver, performing complex tasks including various types of merging plan analysis and potential hazard detection, etc. In some implementations, the processor(s) 115 may be coupled to the memory(ies) 117 via the bus 154 to access data and instructions therefrom and store data therein. The bus 154 may couple the processor(s) 115 to the other components of the vehicle platform(s) 103 including, for example, the sensor(s) 113, the memory(ies) 117, the communication unit(s) 119, and/or and the vehicle data store 121.

The virtualized driver assistance application 120 is computer logic executable to provide perceptive and practical driver assistance to the driver. As illustrated in FIG. 1, the server 101 and the vehicle platform 103a . . . 103n may include instances 120a and 120b . . . 120n of the virtualized driver assistance application 120. In some embodiments, each instance 120a and 120b . . . 120n may comprise one or more components the virtualized driver assistance application 120 depicted in FIG. 2, and may be configured to fully or partially perform the functionalities described herein depending on where the instance resides. In some embodiments, the virtualized driver assistance application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The virtualized driver assistance application 120 may receive and process the vehicle movement data and/or the sensor data, and communicate with other elements of the vehicle platform 103 via the bus 154, such as the memory 117, the communication unit 119, the vehicle data store 121, etc. The virtualized driver assistance application 120 is described in details below with reference to at least FIGS. 2-11B.

The memory(ies) 117 includes a non-transitory computer-usable (e.g., readable, writeable, etc.) medium, which can be any tangible non-transitory apparatus or device that can contain, store, communicate, propagate or transport instructions, data, computer programs, software, code, routines, etc., for processing by or in connection with the processor(s) 115. For example, the memory(ies) 117 may store the virtualized driver assistance application 120 and/or the tracking application 122. In some implementations, the memory(ies) 117 may include one or more of volatile memory and non-volatile memory. For example, the memory(ies) 117 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blue-Ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other computing nodes, such as other vehicle platform(s) 103 and/or server(s) 101, etc. The communication unit 119 may exchange data with other computing nodes using standard communication methods, such as those discussed above.

The sensor(s) 113 includes any type of sensors suitable for the vehicle platform(s) 103. The sensor(s) 113 may be configured to collect any type of signal data suitable to determine characteristics of the vehicle platform 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, traction sensors, switches, vehicle indicator sensors, windshield wiper sensors, geo-location sensors (e.g., Global Positioning System (GPS) sensor), orientation sensor, wireless transceivers (e.g., cellular, WiFi™, near-field, etc.), sonar sensors, ultrasonic sensors, touch sensors, proximity sensors, distance sensors, speed sensors, etc. In some embodiments, one or more sensors 113 may include externally facing sensors provided at the front side, rear side, right side, and/or left side of the vehicle platform 103 in order to capture the situational context surrounding the vehicle platform 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) 113 can capture images of surrounding environments within their sensor range. For example, in the context of a vehicle platform, the image sensors 113 can capture the environment around the vehicle platform 103 including roads, buildings, roadside structures, static road objects (e.g., traffic cones, traffic signs, lanes, road markings, etc.), and/or dynamic road objects (e.g., vehicle platforms 103, pedestrians, bicycles, etc.), etc. In some embodiments, the image sensors 113 may be mounted on the vehicle roof and/or inside the vehicle platform 103 to sense in any direction (forward, rearward, sideward, upward, downward facing, etc.) relative to the moving direction of the vehicle platform 103. In some embodiments, the image sensors 113 may be multidirectional (e.g., LIDAR). In some embodiments, the virtualized driver assistance application 120 may use the sensor data collected by the image sensors 113 and other sensors 113 (e.g., distance sensors, speed sensors, etc.) to detect proximate vehicles located adjacent to the vehicle platform 103 and determine the vehicle movement data of these proximate vehicles.

The vehicle data store 121 includes a non-transitory storage medium that stores various types of data. For example, the vehicle data store 121 may store vehicle data being communicated between different components of a given vehicle platform 103 using a bus, such as a controller area network (CAN) bus. In some embodiments, the vehicle data may include vehicle operation data collected from multiple sensors 113 coupled to different components of the vehicle platform 103 for monitoring operating states of these components, e.g., transmission, wheel speed (Revolutions Per Minute—RPM), steering angle, braking force, etc.

In some embodiments, the vehicle data may include vehicle movement data describing the vehicle movement of the vehicle platform 103. The vehicle movement data of the vehicle platform 103 may include the moving direction in which the vehicle platform 103 proceeds forward, the lane number specifying the lane in which the vehicle platform 103 travels, the vehicle speed, the vehicle acceleration/deceleration metric, the trajectory of the vehicle (e.g., straight, turning, etc.), the vehicle position, etc., of the vehicle platform 103. In some embodiments, the vehicle speed of the vehicle platform 103 may include a longitudinal speed at which the vehicle platform 103 proceeds forward and a lateral speed at which the vehicle platform 103 moves sideways. In some embodiments, the vehicle acceleration/deceleration metric of the vehicle platform 103 may include a longitudinal acceleration/deceleration rate at which the vehicle platform 103 accelerates or decelerates along the moving direction, and a lateral acceleration/deceleration rate at which the vehicle platform 103 accelerates or decelerates along the sideways direction perpendicular to the moving direction. In some embodiments, the vehicle position of the vehicle platform 103 may include a longitudinal position along the moving direction and a lateral position along the sideways direction of the vehicle platform 103. The vehicle position of the vehicle platform 103 may indicate the absolute location of the vehicle platform 103 (e.g., GPS coordinates) or the relative location of the vehicle platform 103 relative to a point of reference (e.g., the roadside unit 107, etc.). Other types of vehicle movement data are also possible and contemplated.

In some embodiments, the vehicle data store 121 may store vehicle movement data of a reference vehicle to which the vehicle platform 103 may adjust its vehicle movement accordingly. Similar to the vehicle movement data of the vehicle platform 103, the vehicle movement data of the reference vehicle may include the moving direction, the lane number, the vehicle speed, the vehicle acceleration/deceleration metric, the vehicle position, etc., of the reference vehicle. In some embodiments, the vehicle data store 121 may store merging plan data describing the merging plan of the vehicle platform 103. The merging plan data may include a simulated position of the reference vehicle, a position range for positioning the vehicle platform 103 according to the simulated position of the reference vehicle, etc.

In some embodiments, the vehicle data store 121 may store augmented reality data that specifies augmented reality parameters for rendering assistance information. In some embodiments, the augmented reality parameters may include the display position, the display size, the appearance features (e.g., vehicle type (e.g., sedan, crossover, SUV, etc.), color, etc.), etc., for overlaying a virtual object in the field of view of the driver of the vehicle platform 103. In some embodiments, the field of view of the driver of the vehicle platform 103 may reflect the area of the roadway environment that the driver of the vehicle platform 103 observes. In this present disclosure, the field of view of the driver of the vehicle platform 103 may also be referred to as the field of view of the roadway environment of the driver of the vehicle platform 103 or simply as the field of view. In some embodiments, the field of view may include a front field of view reflecting the area of the roadway environment that the driver observes when looking ahead, and/or a side field of view reflecting the area of the roadway environment that the driver observes when looking to the side (e.g., left or right).

In some embodiments, the vehicle data store 121 may store roadway data describing the roadway structure of one or more merging zones. As discussed elsewhere herein, a merging zone may include a first lane merging with a second lane at a merging point. In some embodiments, the roadway data of the merging zone may include one or more roadway attributes of the first lane, one or more roadway attributes of the second lane, the merging angle between the first lane and the second lane, the relative position of the merging point between the first lane and the second lane, etc. Non-limiting examples of the roadway attributes describing the first lane or the second lane include, but are not limited to, the road curvature, the road grade, etc., of the corresponding lane. Other types of roadway data are also possible and contemplated.

In some embodiments, the vehicle data store 121 may store driving behavior data describing the driving behaviors associated with the driver of the vehicle platform 103. In some embodiments, the driving behavior data may include the average speed, the average following distance, the braking pattern, the acceleration/deceleration pattern, the lane change pattern, etc., associated with the driver of the vehicle platform 103. Other types of driving behavior data are also possible and contemplated.

In some embodiments, the vehicle data store 121 may be part of a data storage system (e.g., a standard data or database management system) for storing and providing access to data. Other types of data stored in the vehicle data store 121 are also possible and contemplated.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
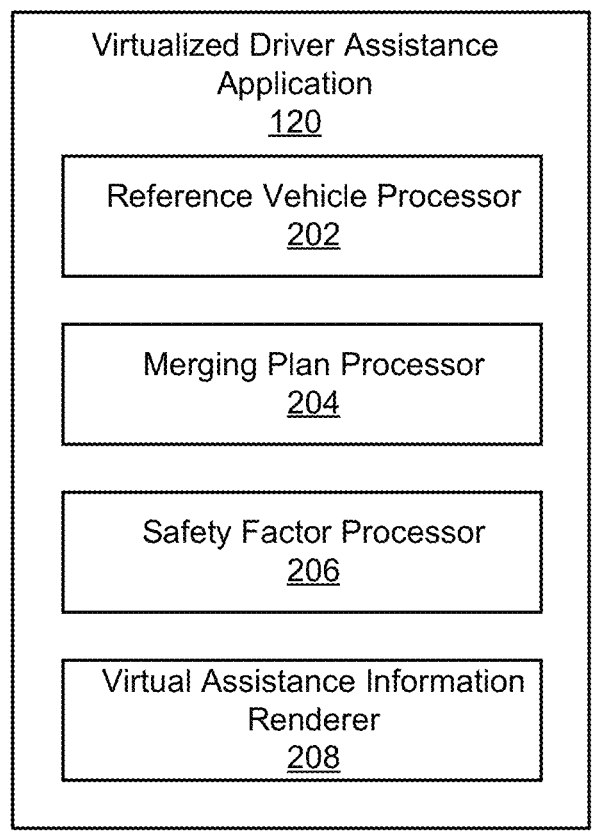
FIG. 2 is a block diagram of an example virtualized driver assistance application.

FIG. 2 is a block diagram of an example virtualized driver assistance application 120. As depicted, the virtualized driver assistance application 120 may include a reference vehicle processor 202, a merging plan processor 204, a safety factor processor 206, and a virtual assistance information renderer 208. It should be understood that the virtualized driver assistance application 120 may include additional components such as, but not limited to, a configuration engine, an encryption/decryption engine, etc., and/or these various components may be combined into a single engine or divided into additional engines. In some embodiments, the virtualized driver assistance application 120 may be implemented in various computing entities of the system 100 and may be configured based on the computing entity in which it is implemented. In some embodiments, the virtualized driver assistance application 120 may be implemented in the server 101 and/or the roadside unit 107, and optionally configured to enable the reference vehicle processor 202 and disable other components of the virtualized driver assistance application 120. In some embodiments, the virtualized driver assistance application 120 may be implemented in the vehicle platform 103 and optionally configured to enable the merging plan processor 204, the safety factor processor 206, and the virtual assistance information renderer 208, and disable other components of the virtualized driver assistance application 120. Other configurations of the virtualized driver assistance application 120 are also possible and contemplated.

The reference vehicle processor 202, the merging plan processor 204, the safety factor processor 206, and the virtual assistance information renderer 208 may be implemented as software, hardware, or a combination of the foregoing. In some embodiments, the reference vehicle processor 202, the merging plan processor 204, the safety factor processor 206, and the virtual assistance information renderer 208 may be communicatively coupled by the bus 154 and/or the processor 115 to one another and/or to the other components of the computing device 152. In some embodiments, one or more of the components 120, 202, 204, 206, and/or 208 are sets of instructions executable by the processor 115 to provide their functionality. In further embodiments, one or more of the components 120, 202, 204, 206, and/or 208 are storable in the memory 117 and are accessible and executable by the processor 115 to provide their functionality. In any of the foregoing embodiments, these components 120, 202, 204, 206, and/or 208 may be adapted for cooperation and communication with the processor 115 and other components of the computing device 152. The virtualized driver assistance application 120 and its components 202, 204, 206, 208 are described in further detail below with reference to at least FIGS. 3-11B.

As discussed elsewhere herein, the virtualized driver assistance application 120 is computer logic executable to provide an augmented driver assistance experience simplifies the complexities of vehicle interaction. In some embodiments, the virtualized driver assistance application 120 can render virtual information that directs a driver to perform certain actions to facilitate a smooth merging with other vehicle platforms 103 in a merging zone. As discussed elsewhere herein, the merging zone may include at least a first lane merging with a second lane at a merging point. In some embodiments, the vehicle platforms 103 traveling in the second lane may attempt to merge into the first lane as they reach the merging point. Thus, the vehicle platforms 103 traveling in the second lane may be referred to as the merging vehicles and the vehicle platforms 103 traveling in the first lane may be referred to as the mainstream vehicles.

Figure 10A:
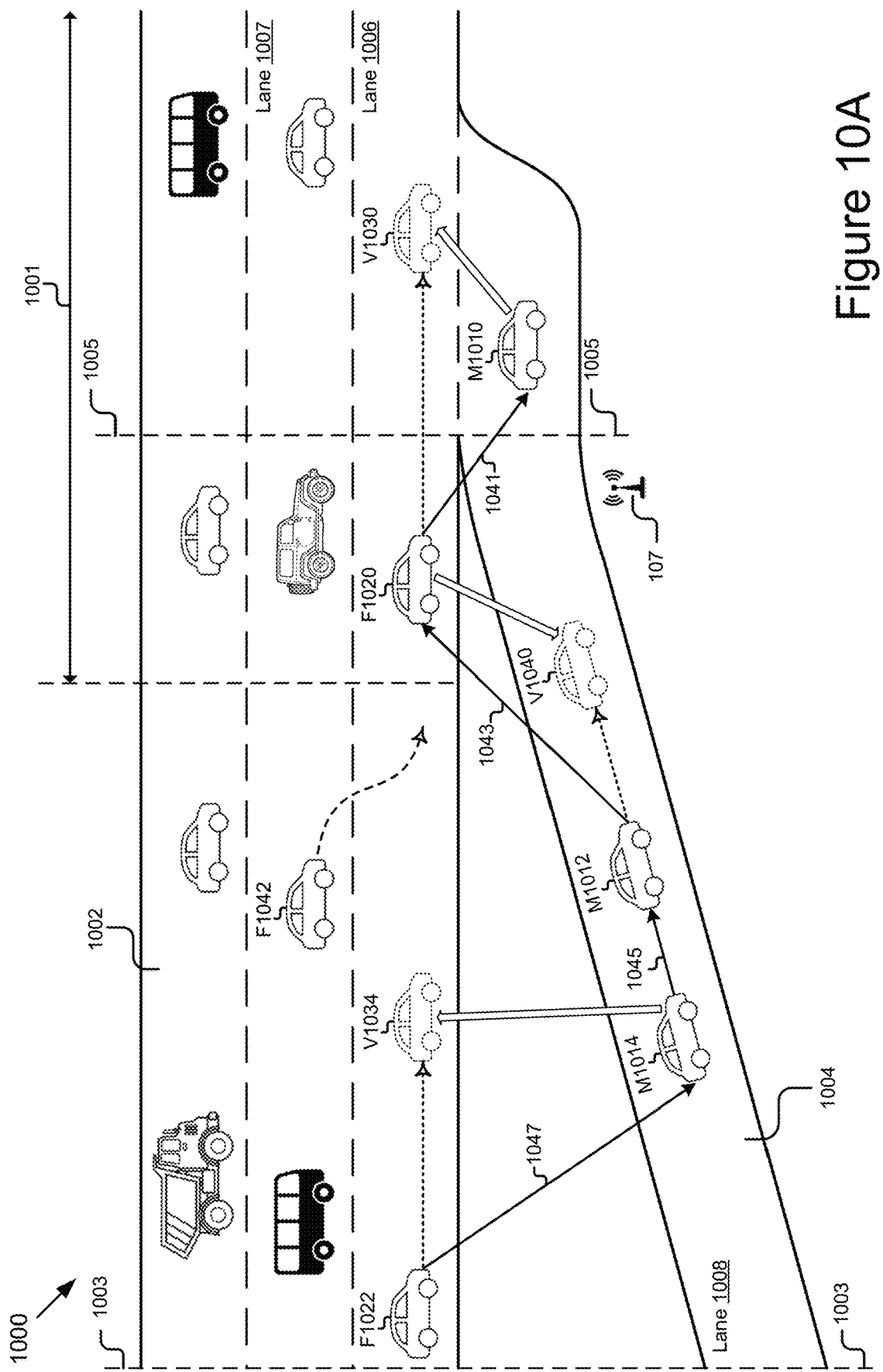
FIG. 10A illustrates an example merging situation in a merging zone.

An example merging situation in a merging zone 1000 is illustrated in FIG. 10A. As depicted, the merging zone 1000 may include multiple road segments, the road segments of the merging zone 1000 may include a freeway segment 1002 and an entrance ramp segment 1004 of a freeway. In some embodiments, the freeway segment 1002 may include one or more freeway lanes, the one or more freeway lanes may include a ramp adjacent lane 1006 directly adjacent to the entrance ramp segment 1004. For example, the ramp adjacent lane 1006 may be the right-most lane or the left-most lane among the one or more freeway lanes of the freeway segment 1002. In some embodiments, the entrance ramp segment 1004 may include a freeway entrance lane 1008 from which the merging vehicles may shift to the ramp adjacent lane 1006 to enter the freeway segment 1002. In this example, the entrance ramp segment 1004 may include one lane, although it should be understood that other scenarios are applicable, such as but not limited to those in which the entrance ramp segment includes multiple lanes. As depicted in FIG. 10A, the ramp adjacent lane 1006 of the freeway segment 1002 may merge with the freeway entrance lane 1008 of the entrance ramp segment 1004 at the merging point 1005. In this example, the freeway entrance lane 1008 may be considered the first lane and the freeway entrance lane 1008 may be considered the second lane. It should be understood that the first lane and the second lane merging with one another may be located on different road segments of the merging zone (e.g., the freeway segment 1002 and the entrance ramp segment 1004) or on the same road segment of the merging zone (e.g., the entrance ramp segment 1004).

As depicted in FIG. 10A, the freeway segment 1002 and the entrance ramp segment 1004 may be provided with one or more roadside units 107 located along their roadway to transmit data to and/or receive data from the vehicle platforms 103 traveling on these road segments. In some embodiments, these vehicle platforms 103 may transmit data to and/or receive data from the roadside units 107 as they reach the communication start point 1003 in their corresponding lane. In some embodiments, the vehicle platforms 103 traveling on the road segments of the merging zone may include one or more merging vehicles traveling on the entrance ramp segment and one or more freeway vehicles traveling on the freeway segment. As an example, in the merging situation depicted in FIG. 10A, the merging vehicles may include the merging vehicles M1010, M1012, M1014 traveling on the entrance ramp segment 1004, the freeway vehicles may include the freeway vehicles F1020, F1022 traveling in the ramp adjacent lane 1006 and other freeway vehicles traveling in other lanes of the freeway segment 1002.

In some embodiments, the merging zone may include a conflict area. As discussed elsewhere herein, the conflict area may be the area of the merging zone in which the vehicle platforms 103 in different lanes likely perform one or more lane changes to shift to a particular lane (e.g., the ramp adjacent lane 1006) to enter or prepare to exit the freeway. Thus, these vehicle platforms 103 could target the same opening space in that particular lane or likely cross paths with other vehicle platforms 103 due to the lane changes. As a result, the likelihood of collision between the vehicle platforms 103 in the conflict area is usually higher than other areas of the merging zone.

Figure 9:
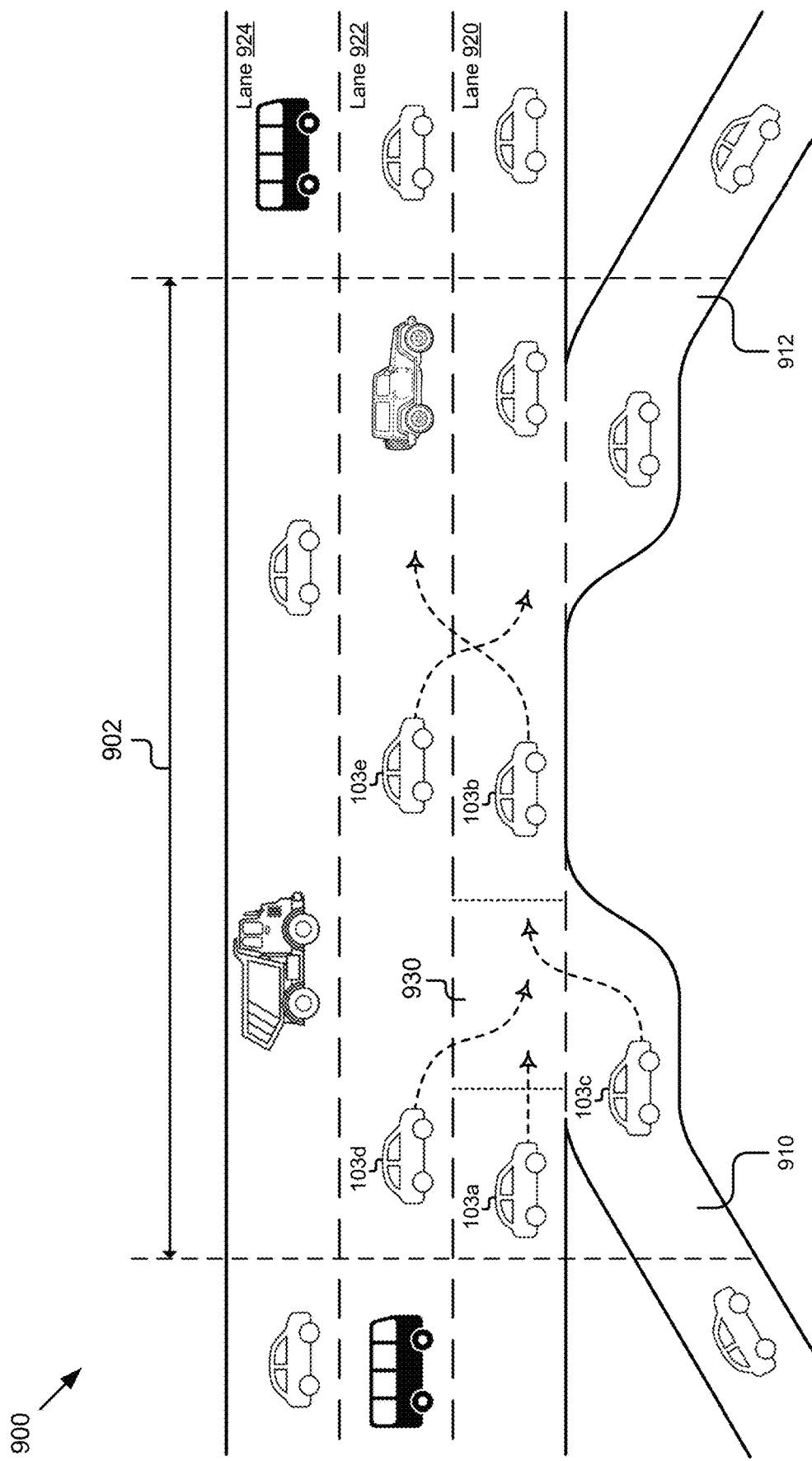
FIG. 9 illustrates an example conflict area of a merging zone.

As an example of the conflict area, FIG. 9 illustrates a conflict area 902 of a merging zone 900. The merging zone 900 may be a portion of a traffic interchange (e.g., cloverleaf interchange) and may include an entrance ramp segment 910 located relatively close to an exit ramp segment 912. As depicted in FIG. 9, the freeway vehicle 103a may travel in the ramp adjacent lane 920, the merging vehicle 103c may plan on shifting from the entrance ramp segment 910 to the ramp adjacent lane 920 to enter the freeway, and the freeway vehicle 103d may plan on shifting from the freeway lane 922 to the ramp adjacent lane 920 to take the upcoming exit ramp segment 912 to exit the freeway. Thus, there is a potential collision in the conflict area 902 as the freeway vehicle 103a, the merging vehicle 103c, the freeway vehicle 103d may target the same opening space 930 in the ramp adjacent lane 920. As depicted in FIG. 9, the freeway vehicle 103e may plan on shifting from the freeway lane 922 to the ramp adjacent lane 920 to take the exit ramp segment 912 to exit the freeway, and the freeway vehicle 103b may plan on shifting from the ramp adjacent lane 920 to the freeway lane 922 to continue traveling on the freeway with higher speed. Thus, there is another potential collision in the conflict area 902 as the freeway vehicle 103e and the freeway vehicle 103b may cross paths with one another. As another example of the conflict area, in the merging situation depicted in FIG. 10A, the merging zone 1000 may include the conflict area 1001.

Figure 3:
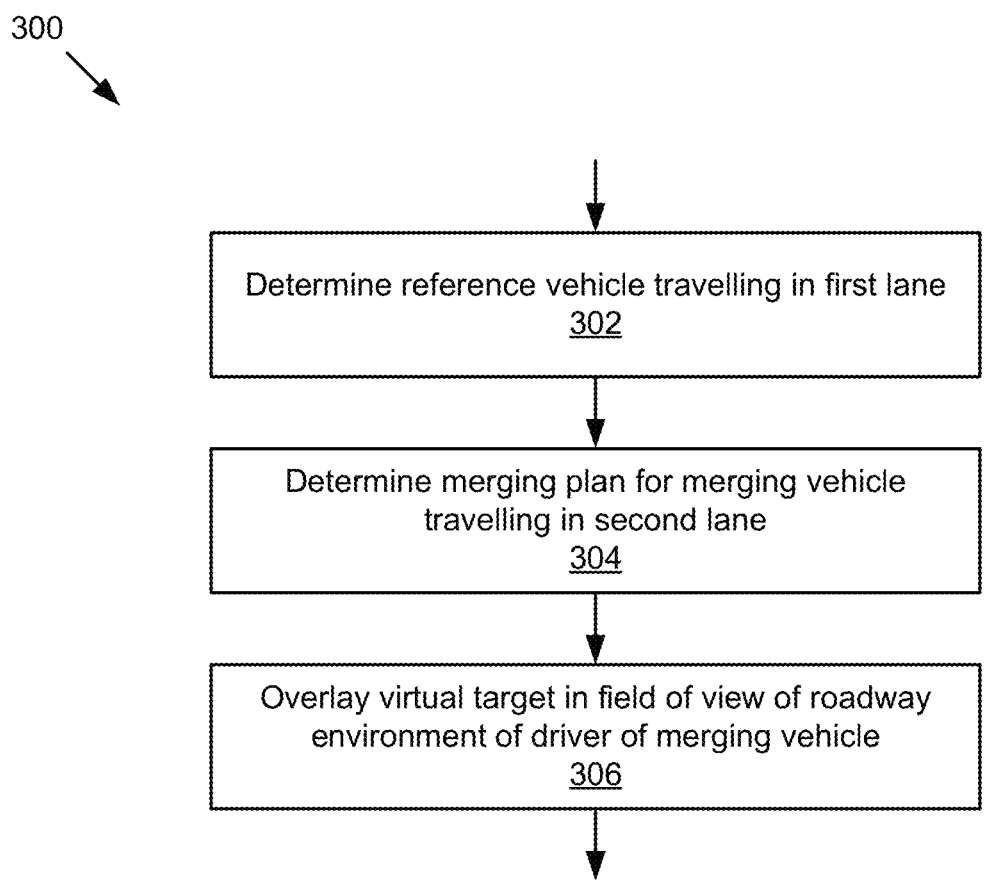
FIG. 3 is a flowchart of an example method for providing virtual virtualized driver assistance to the driver.

By way of illustration, FIG. 3 is a flowchart of an example method 300 for providing virtualized driver assistance to a driver. In some embodiments, the virtualized driver assistance application 120 may perform the method 300 to assist the driver of a merging vehicle to smoothly merge from the second lane to the first lane in the merging zone. As discussed elsewhere herein, the first lane may merge with the second lane at the merging point. In block 302, the reference vehicle processor 202 may determine a reference vehicle traveling in the first lane, the merging vehicle in the second lane may rely on the reference vehicle in the first lane to smoothly merge from the second lane to the first lane as the merging vehicle reaches the merging point. As an example, in the merging situation depicted in FIG. 10A, the merging vehicle M1012 may travel in the freeway entrance lane 1008 of the entrance ramp segment 1004. In this example, the reference vehicle processor 202 may determine a reference vehicle traveling in the ramp adjacent lane 1006 of the freeway segment 1002 to which the merging vehicle M1012 may reference in order to smoothly merge from the freeway entrance lane 1008 to the ramp adjacent lane 1006.

Figure 4:
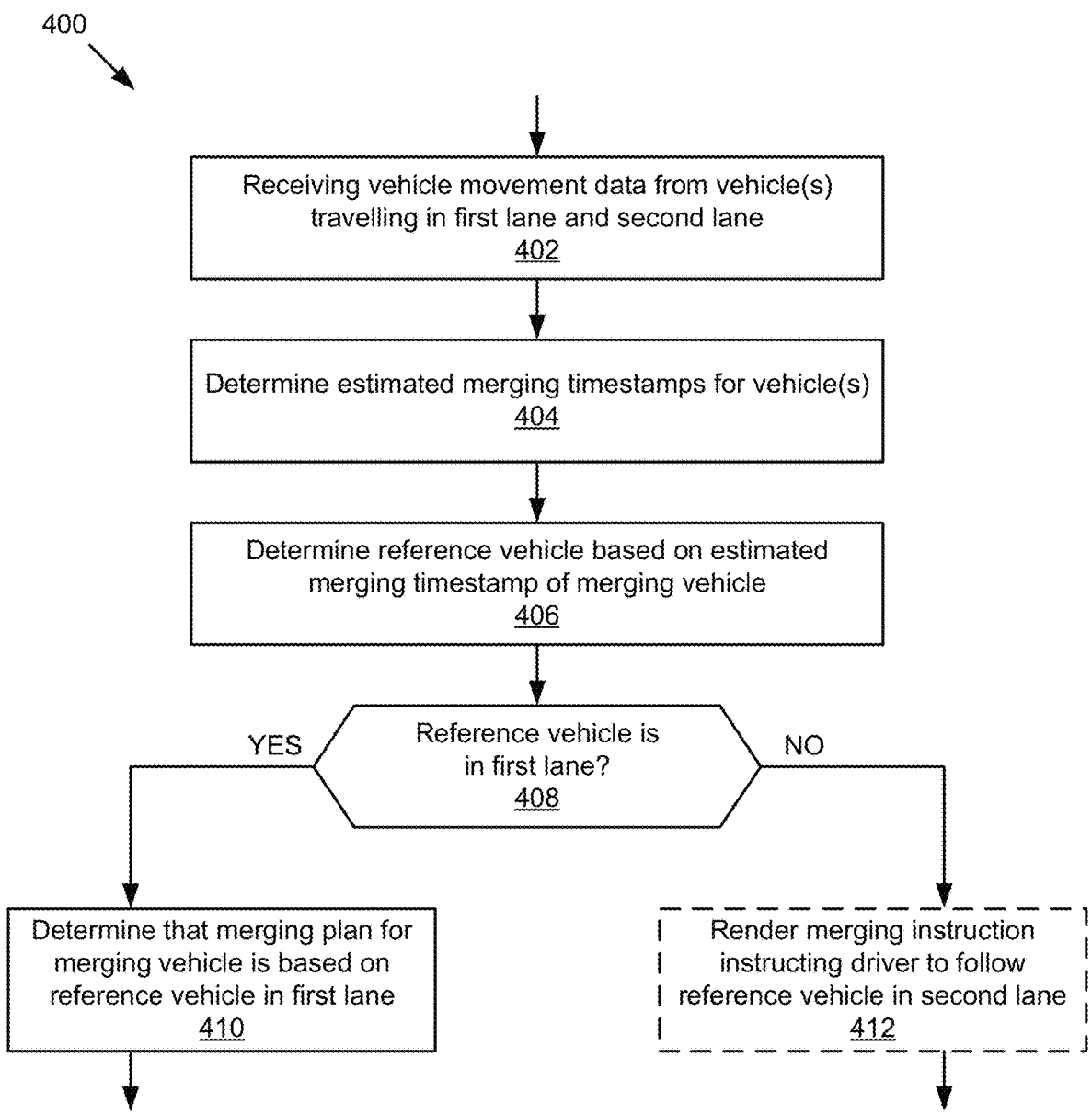
FIG. 4 is a flowchart of an example method for determining a reference vehicle.

FIG. 4 is a flowchart of an example method 400 for determining a reference vehicle corresponding to a merging vehicle in the second lane. As discussed above, the reference vehicle may be the vehicle platform 103 to which the merging vehicle may reference in order to smoothly merge from the second lane to the first lane as the merging vehicle reaches the merging point. In some embodiments, the reference vehicle may be the vehicle platform 103 that likely arrives at the merging point consecutively prior to the merging vehicle, and thus the merging vehicle may need to adjust its vehicle movement to avoid potential collision with the reference vehicle as the merging vehicle merges from the second lane to the first lane.

In block 402, the roadside unit 107 may receive the vehicle movement data from one or more vehicle platforms 103 traveling in the first lane and the second lane of the merging zone. As discussed elsewhere herein, the vehicle movement data of a vehicle platform 103 may include the moving direction, the lane number, the vehicle speed, the acceleration/deceleration metric, the vehicle position, etc., of the vehicle platform 103. In some embodiments, the vehicle platform 103 may analyze its vehicle movement data, determine whether the vehicle platform 103 travels in the first lane or the second lane of the merging zone based on its lane number, and determine whether the vehicle platform 103 reaches the communication start point of the merging zone based on its vehicle position, speed, and/or other aspects (e.g., acceleration or deceleration, etc.). If the vehicle platform 103 determines that the vehicle platform 103 travels in the first lane or the second lane of the merging zone and reaches the communication start point of the merging zone, the vehicle platform 103 may transmit its vehicle movement data to the roadside unit 107. The roadside unit 107 may then send the vehicle movement data of the vehicle platform 103 to the reference vehicle processor 202.

Alternatively, the roadside unit 107 may receive the vehicle movement data from multiple vehicle platforms 103 located within its communication range, the communication range of the roadside unit 107 may cover a predefined distance from a point of reference (e.g., 450 m from the merging point 1005). In some embodiments, the roadside unit 107 may analyze the vehicle movement data of the vehicle platforms 103 located within its communication range, and determine the vehicle platforms 103 traveling in the first lane and the second lane of the merging zone based on their lane number. The roadside unit 107 may then transmit the vehicle movement data of the vehicle platforms 103 traveling in the first lane and the second lane to the reference vehicle processor 202, and disregard the vehicle movement data of other vehicle platforms 103 located within its communication range.

In block 404, the reference vehicle processor 202 may estimate one or more merging timestamps at which one or more vehicle platforms 103 traveling in the first lane and the second lane may arrive at the merging point between the first lane and the second lane. In some embodiments, to determine the estimated merging timestamp of a vehicle platform 103 traveling in the first lane or the second lane, the reference vehicle processor 202 may analyze the vehicle movement data of the vehicle platform 103 to extract the vehicle position and the vehicle speed (including the speed's rate of change in some cases) of the vehicle platform 103. The reference vehicle processor 202 may determine the distance d between the vehicle position of the vehicle platform 103 and the merging point (e.g., 240 m), and compute the travel time $\Delta_t$ for the vehicle platform 103 to travel the distance d and reach the merging point using the longitudinal speed $v_{longitudinal}$ of the vehicle platform 103 (e.g., 30 m/s). For example, the reference vehicle processor 202 may compute the travel time $\Delta_t = d/v_{longitudial} = 8$ s. The reference vehicle processor 202 may then compute the estimated merging timestamp $t_{merging}$ at which the vehicle platform 103 potentially arrives at the merging point using the current timestamp $t_{current}$ (e.g., 14:00:00). For example, the reference vehicle processor 202 may compute the estimated merging timestamp $t_{merging}=t_{current}+\Delta_t=14{:}00{:}08$.

In some embodiments, to determine the estimated merging timestamp of the vehicle platform 103 traveling in the first lane or the second lane, the reference vehicle processor 202 may implement a machine learning model, the machine learning model may include a merging timestamp estimator and a feedback calculator. In some embodiments, the reference vehicle processor 202 may train the machine learning model using the vehicle movement data of multiple vehicle platforms 103 in the first lane and the second lane and their actual merging timestamps. For example, in each training cycle of the training stage, the merging timestamp estimator may compute the estimated merging timestamp for a first vehicle platform 103 using the vehicle movement data of one or more vehicle platforms 103 traveling in the first lane and the second lane. The feedback calculator may compute a feedback value based on the estimated merging timestamp and the actual merging timestamp of first vehicle platform 103, and back-propagate the feedback value to the merging timestamp estimator. The merging timestamp estimator may then adjust one or more model parameters of the machine learning model based on the feedback value.

In some embodiments, once the machine learning model is sufficiently trained (e.g., the model parameters of the machine learning model remain substantially unchanged for a predefined number of training cycles), the reference vehicle processor 202 may apply the trained machine learning model to the vehicle movement data of multiple vehicle platforms 103 travelling in the first lane and the second lane at a particular timestamp, and thereby determining the estimated merging timestamps of these vehicle platforms 103. Alternatively, the reference vehicle processor 202 may compute approximate merging timestamps for one or more vehicle platforms 103 and subsequently adjust the approximate merging timestamps of these vehicle platforms 103 using the machine learning model. Other implementations for estimating the merging timestamps of the vehicle platforms 103 are also possible and contemplated.

Continuing the merging situation in FIG. 10A, the reference vehicle processor 202 may receive the vehicle movement data of the freeway vehicles F1020, F1022 traveling in the ramp adjacent lane 1006 and the vehicle movement data of the merging vehicles M1010, M1012, M1014 traveling in the freeway entrance lane 1008. The reference vehicle processor 202 may process the vehicle movement data of these vehicles to estimate the merging timestamps at which these vehicles potentially arrive at the merging point 1005 as discussed above. In this example, the reference vehicle processor 202 may determine the estimated merging timestamps of the freeway vehicles F1020, F1022 to be 14:00:03, 14:00:14, and determine the estimated merging timestamps of the merging vehicles M1010, M1012, M1014 to be 14:00:00, 14:00:08, 14:00:10.

In block 406, the reference vehicle processor 202 may determine a reference vehicle corresponding to the merging vehicle based on the estimated merging timestamp of the merging vehicle. In some embodiments, the reference vehicle processor 202 may determine a first merging timestamp among the estimated merging timestamps of the vehicle platforms 103 traveling in the first lane and the second lane, the first merging timestamp may have the lowest time distance prior to the estimated merging timestamp of the merging vehicle. The reference vehicle processor 202 may then determine the vehicle platform 103 predicted to reach the merging point at the first merging timestamp to be the reference vehicle corresponding to the merging vehicle. Alternatively, the reference vehicle processor 202 may determine a sequential order in which the vehicle platforms 103 traveling in the first lane and the second lane may likely arrive at the merging point based on the estimated merging timestamps of these vehicle platforms 103. The reference vehicle processor 202 may then determine the vehicle platform 103 directly preceding the merging vehicle in the sequential order to be the reference vehicle corresponding to the merging vehicle. Thus, the reference vehicle may likely arrive at the merging point prior to the merging vehicle without other vehicles arriving at the merging point in between. Therefore, the merging vehicle may adjust its vehicle movement based on the reference vehicle as the merging vehicle proceeds towards the merging point, thereby smoothly merging with the reference vehicle as the merging vehicle reaches the merging point and merges into the first lane.

Continuing the merging situation in FIG. 10A, the reference vehicle processor 202 may sort the vehicles traveling in the ramp adjacent lane 1006 and the freeway entrance lane 1008 by chronological order of their estimated merging timestamps. In this example, the reference vehicle processor 202 may determine the sequential order in which these vehicles likely arrive at the merging point 1005 to be (M1010, F1020, M1012, M1014, F1022) as indicated by the arrows 1041, 1043, 1045, 1047 in FIG. 10A. Thus, for the merging vehicle M1012, the reference vehicle processor 202 may determine the reference vehicle to be the freeway vehicle F1020. The estimated merging timestamp of the freeway vehicle F1020 (e.g., 14:00:03) may have the lowest time distance from the estimated merging timestamp of the merging vehicle M1012 (e.g., 14:00:08) among the estimated merging timestamps prior to the estimated merging timestamp of the merging vehicle M1012. Similarly, for the merging vehicle M1014, the reference vehicle processor 202 may determine the reference vehicle to be the merging vehicle M1012.

In block 408, the reference vehicle processor 202 may determine whether the reference vehicle corresponding to the merging vehicle is in the first lane. If the reference vehicle corresponding to the merging vehicle is in the first lane, the method 400 may proceed to block 410. In block 410, the reference vehicle processor 202 may determine that the reference vehicle corresponding to the merging vehicle is in the first lane while the merging vehicle is in the second lane. Thus, the reference vehicle processor 202 may determine that the merging plan for the merging vehicle in the second lane is based on the reference vehicle in the first lane, and the merging assistance information using a virtual target may be rendered to the driver of the merging vehicle based on the merging plan. If the reference vehicle corresponding to the merging vehicle is not in the first lane, the reference vehicle processor 202 may determine that the reference vehicle corresponding to the merging vehicle and the merging vehicle are both in the second lane. As a result, the driver of the merging vehicle can observe the reference vehicle in front of the merging vehicle in the second lane, and thus rendering the merging assistance information using a virtual target is unnecessary. The method 400 may proceed to block 412. In block 412, the virtual assistance information renderer 208 may optionally render a merging instruction instructing the driver of the merging vehicle to follow the reference vehicle ahead of the merging vehicle in the second lane to merge from the second lane to the first lane.

Continuing the merging situation in FIG. 10A, the reference vehicle processor 202 may determine that the merging vehicle M1012 is in the freeway entrance lane 1008 while its reference vehicle F1020 is in the ramp adjacent lane 1006. Thus, the reference vehicle processor 202 may determine that the merging plan for the merging vehicle M1012 is based on the corresponding reference vehicle F1020, and the merging assistance information using a virtual target may be rendered to the driver of the merging vehicle M1012 based on the merging plan. In this example, the reference vehicle processor 202 may also determine that the merging vehicle M1014 and its reference vehicle M1012 are both in the freeway entrance lane 1008. Thus, the reference vehicle processor 202 may determine that the driver of the merging vehicle M1014 can observe and follow the reference vehicle M1012 ahead to perform the merging process, and thus the merging assistance information using a virtual target is unnecessary.

Referring back to FIG. 3, if the merging vehicle is in the second lane and the reference vehicle corresponding to the merging vehicle is in the first lane, in block 304, the merging plan processor 204 may determine the merging plan for the merging vehicle traveling in the second lane to merge into the first lane based on the vehicle position of the reference vehicle in the first lane and/or other characteristics, such as one or more dynamic characteristics like speed, acceleration, deceleration, turning, braking, etc. In some embodiments, the merging plan of the merging vehicle may be a protocol or a strategy to be complied with by the merging vehicle to safely and smoothly merge from the second lane to the first lane. In some embodiments, the merging plan may specify a target object to which the merging vehicle may reference, a position range for positioning the merging vehicle according to the target object, etc. Other forms of merging plan are also possible and contemplated. In some embodiments, the target object may be generated in the form of a virtual target. In block 306, the virtual assistance information renderer 208 may overlay via a display device the virtual target in the field of view of the roadway environment of the driver of the merging vehicle based on the merging plan of the merging vehicle.

Figure 5:
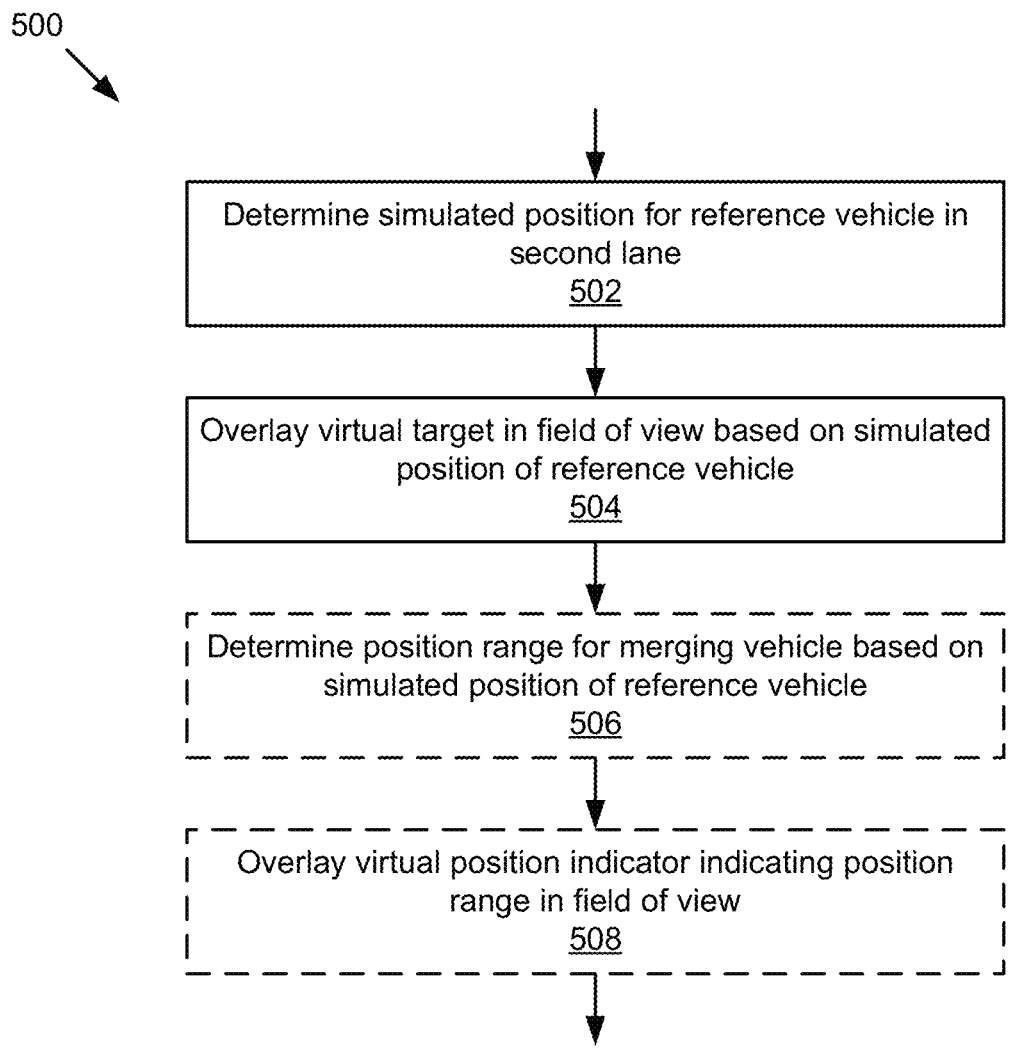
FIG. 5 is a flowchart of an example method for determining a merging plan for a merging vehicle and rendering virtualized assistance information to the driver based on the merging plan.

FIG. 5 is a flowchart of an example method 500 for determining the merging plan for the merging vehicle and rendering virtualized merging assistance information to the driver of the merging vehicle based on the merging plan. As discussed above, the merging plan may specify a target object to which the merging vehicle may reference to perform the merging process. In some embodiments, the target object may be a virtual target generated based on the reference vehicle corresponding to the merging vehicle. In block 502, the merging plan processor 204 may determine a simulated position for the reference vehicle in the second lane based on the vehicle position of the reference vehicle in the first lane and/or other characteristics, such as one or more dynamic characteristics like speed, acceleration deceleration, turning, braking, etc. In some cases, the simulated position of the reference vehicle may be in front of the vehicle position of the merging vehicle in the second lane.

Figure 6A:
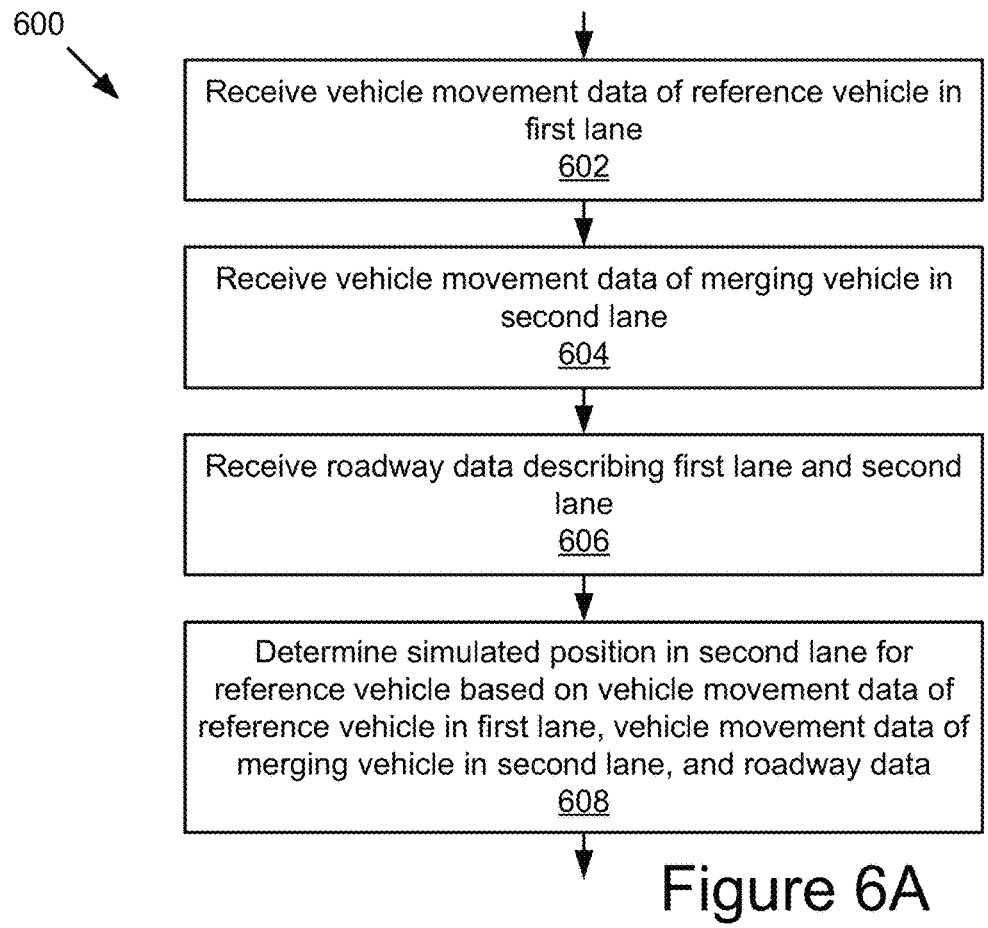
FIG. 6A is a flowchart of an example method for determining a simulated position of the reference vehicle.

FIG. 6A is a flowchart of an example method 600 for determining the simulated position of the reference vehicle. In block 602, the merging plan processor 204 may receive the vehicle movement data of the reference vehicle in the first lane. In some embodiments, once the reference vehicle corresponding to the merging vehicle is determined, the merging vehicle and the reference vehicle may establish a V2V connection with one another and the reference vehicle may transmit its vehicle movement data to the merging vehicle via the V2V connection. In some embodiments, the reference vehicle may also transmit the appearance data describing its visual appearance and the driving behavior data describing the driving behaviors of its driver to the merging vehicle. Alternatively, the merging vehicle may receive the vehicle movement data, the appearance data, and/or the driving behavior data associated with the reference vehicle from the server 101 via a V2I connection. Thus, the merging plan processor 204 may receive the data of the reference vehicle via V2I connection and/or V2V connection. This implementation is particularly advantageous because it can reduce the negative impacts caused by limited accuracy of detection techniques or the surrounding environment (e.g., weather condition, lighting condition, etc.) on the reliability of the assistance information provided to the driver.

In block 604, the merging plan processor 204 may receive the vehicle movement data of the merging vehicle in the second lane. For example, the merging plan processor 204 may retrieve the vehicle movement data of the merging vehicle in the second lane from the vehicle data store 121. In block 606, the merging plan processor 204 may receive the roadway data describing the first lane and the second lane. For example, the merging plan processor 204 may retrieve the roadway data from the vehicle data store 121.

In block 608, the merging plan processor 204 may determine the simulated position of the reference vehicle in the second lane based on the vehicle movement data of the reference vehicle in the first lane, the vehicle movement data of the merging vehicle in the second lane, and the roadway data. In some embodiments, the simulated position of the reference vehicle may indicate the relative position of the reference vehicle ahead of the vehicle position of the merging vehicle in the second lane given the reference vehicle is simulated as traveling in the second lane. As discussed elsewhere herein, the vehicle movement data of the reference vehicle may include the longitudinal speed and the lateral speed, the longitudinal acceleration/deceleration rate and the lateral acceleration/deceleration rate, the longitudinal position and the lateral position, etc., of the reference vehicle in the first lane. Similarly, the vehicle movement data of the merging vehicle may include the longitudinal speed and the lateral speed, the longitudinal acceleration/deceleration rate and the lateral acceleration/deceleration rate, the longitudinal position and the lateral position, etc., of the merging vehicle in the second lane. The roadway data may include the road curvature, the road grade, etc., of the first lane and the second lane, and the merging angle, the relative position of the merging point, etc., between the first lane and the second lane. In some embodiments, the merging plan processor 204 may determine the simulated position of the reference vehicle in the second lane based on these factors using geometric and kinematic computation. Other implementations for determining the simulated position of the reference vehicle are also possible and contemplated.

Figure 6B:
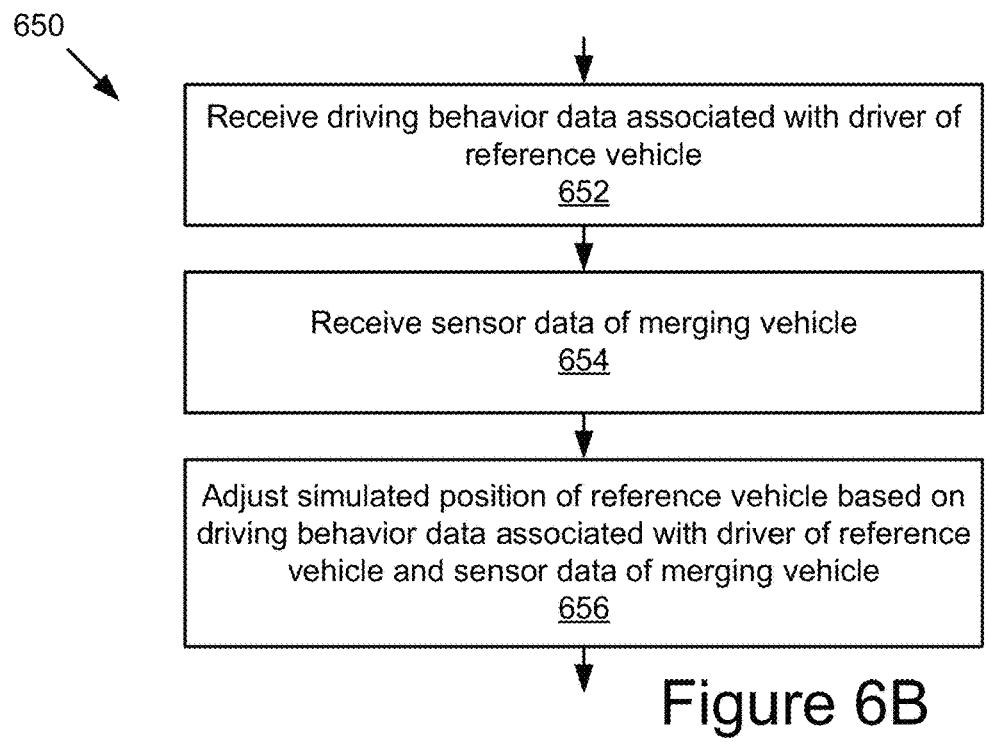
FIG. 6B is a flowchart of an example method for adjusting the simulated position of the reference vehicle.

In some embodiments, once the simulated position of the reference vehicle in the second lane is determined, the merging plan processor 204 may further adjust the simulated position of the reference vehicle in the second lane. FIG. 6B is a flowchart of an example method 650 for adjusting the simulated position of the reference vehicle. In block 652, the merging plan processor 204 may receive the driving behavior data associated with the driver of the reference vehicle. For example, the merging plan processor 204 may receive the driving behavior data from the reference vehicle via the V2V connection. In block 654, the merging plan processor 204 may receive the sensor data captured by one or more sensors 113 of the merging vehicle. For example, the merging plan processor 204 may retrieve the sensor data of the merging vehicle from the vehicle data store 121.

In block 658, the merging plan processor 204 may adjust the simulated position of the reference vehicle in the second lane based on the driving behavior data associated with the driver of the reference vehicle and the sensor data of the merging vehicle. In some embodiments, the merging plan processor 204 may analyze the driving behavior data associated with the driver of the reference vehicle, and assign an aggressive metric indicating the level of driving aggressiveness to the driver. As an example, the driving behavior data of the driver may indicate that the driver usually drives above the speed limit with an abrupt braking pattern and a short following distance (e.g., less than 2 s). Thus, the merging plan processor 204 may determine that the driver of the reference vehicle often drives aggressively and assign the aggressive metric of 0.87 to the driver.

In some embodiments, the merging plan processor 204 may adjust the simulated position of the reference vehicle in the second lane based on the aggressive metric of its driver. For example, the merging plan processor 204 may adjust the distance between the simulated position of the reference vehicle and the vehicle position of the merging vehicle in the second lane to be directly proportional to the aggressive metric associated with the driver of the reference vehicle. As discussed elsewhere herein, the simulated position of the reference vehicle may be indicated by a virtual target, and the merging vehicle may adjust its vehicle movement based on the virtual target. Thus, if the reference vehicle is operated by an aggressive driver, the merging vehicle may maintain a sufficient following distance relative to the simulated position of the reference vehicle indicated by the virtual target in which the simulated position of the reference vehicle is adjusted to be further away, thereby reducing the risk of collision in case the vehicle speed of the reference vehicle is abruptly changed when the merging vehicle merges with the reference vehicle in the first lane.

As discussed above, the merging plan processor 204 may also adjust the simulated position of the reference vehicle in the second lane based on the sensor data of the merging vehicle. In some embodiments, the merging plan processor 204 may analyze the sensor data of the merging vehicle and determine the driving condition at the merging zone. The merging plan processor 204 may then adjust the simulated position of the reference vehicle in the second lane based on the driving condition. As an example, the merging plan processor 204 may determine that the vehicle platforms 103 in the merging zone are traveling in heavy rain with limited traction due to the sensor data collected from the windshield wiper sensor(s) and the traction sensor(s) of the merging vehicle. In this example, the merging plan processor 204 may increase the distance between the simulated position of the reference vehicle and the vehicle position of the merging vehicle in the second lane by a predefined distance value (e.g., 6m) due to adverse driving conditions. Thus, in the adverse driving conditions, the merging vehicle may maintain a sufficient following distance relative to the simulated position of the reference vehicle indicated by the virtual target in which the simulated position of the reference vehicle is adjusted to be further away, thereby reducing the risk of collision in case of maneuver failures when the merging vehicle merges with the reference vehicle in the first lane.

As an example of the reference vehicle corresponding to the merging vehicle and the simulated position of the reference vehicle corresponding to the merging vehicle in the second lane, in the merging situation in FIG. 10A, the reference vehicle processor 202 may determine the reference vehicle corresponding to the merging vehicles M1012 and M1014 to be the freeway vehicle F1020 and the merging vehicle M1012 as indicated by the arrows 1043 and 1045 in FIG. 10A. In this example, the merging vehicle M1012 is in the freeway entrance lane 1008 while its reference vehicle F1020 is in the ramp adjacent lane 1006. As depicted in FIG. 10A, the simulated position of the reference vehicle F1020 in the freeway entrance lane 1008 is illustrated with the virtual representation V1040.

In some embodiments, in addition to determining the reference vehicle corresponding to the merging vehicle and the simulated position of the reference vehicle corresponding to the merging vehicle in the second lane, the reference vehicle processor 202 and the merging plan processor 204 may also perform the method 400 in FIG. 4, the method 600 in FIG. 6A, the method 650 in FIG. 6B to determine the reference vehicle corresponding to the mainstream vehicle and the simulated position of the reference vehicle corresponding to the mainstream vehicle in the first lane in a similar manner. As an example, in the merging situation in FIG. 10A, the reference vehicle processor 202 may determine the reference vehicle corresponding to the freeway vehicles F1020 and F1022 to be the merging vehicles M1010 and M1014 as indicated by the arrows 1041, 1047 in FIG. 10A. In this example, the freeway vehicles F1022 and F1022 are in the ramp adjacent lane 1006 while their reference vehicles M1010 and M1014 are in the freeway entrance lane 1008. As depicted in FIG. 10A, the simulated positions of the reference vehicle M1020 and M1014 in the freeway entrance lane 1008 are illustrated with the virtual representations V1030 and V1034.

Figure 10B:
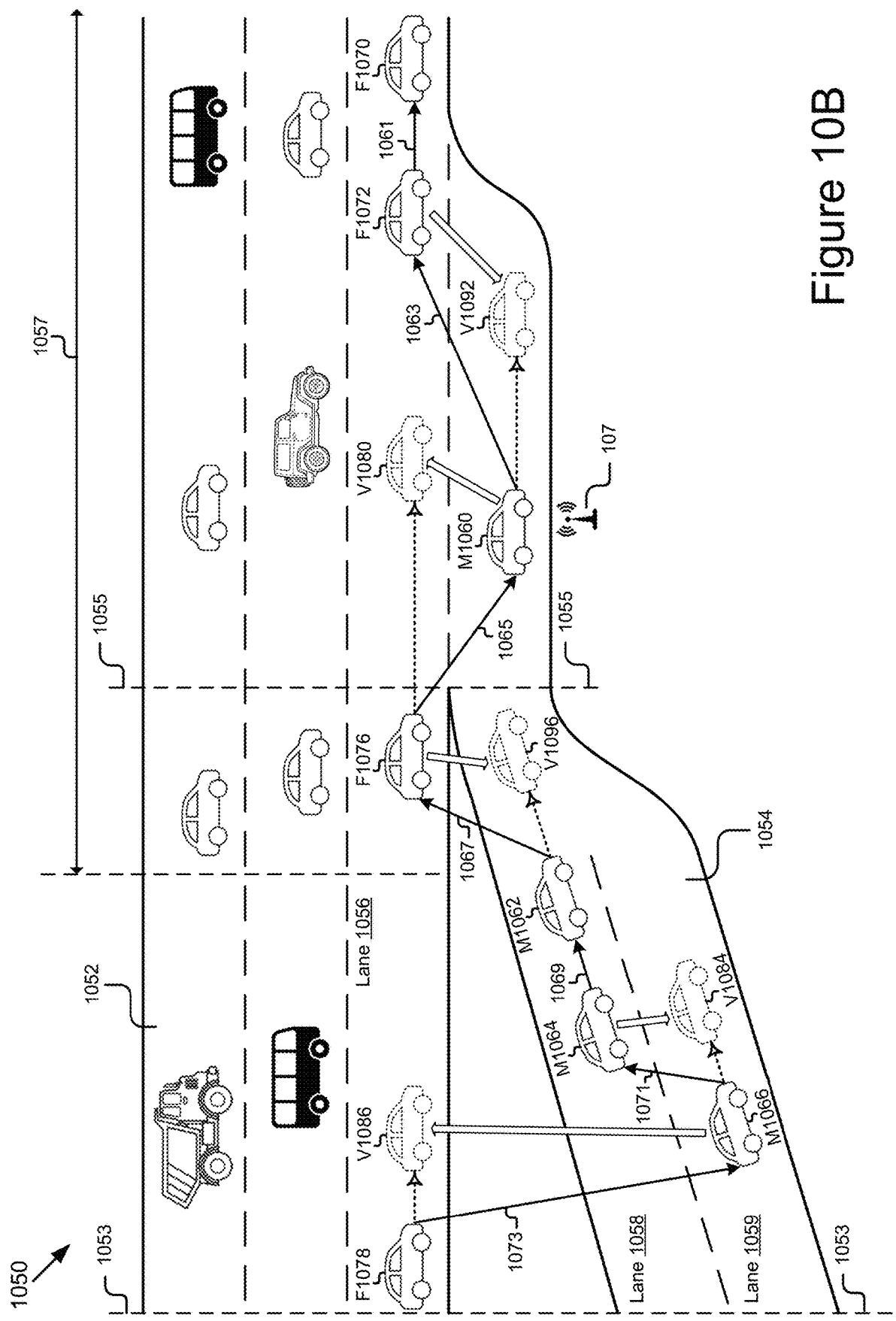
FIG. 10B illustrates another example merging situation in another merging zone.

FIG. 10B illustrates another merging situation in a merging zone 1050 in which the entrance ramp segment 1054 includes multiple lanes that eventually merge into a single lane. In this example, the reference vehicle processor 202 may determine the reference vehicle corresponding to the freeway vehicles F1072, F1076, F1078 to be the freeway vehicle F1070 and the merging vehicles M1060, M1066, and determine the reference vehicle for the merging vehicles M1060, M1062, M1064, M1066 to be the freeway vehicles F1072, F1076 and the merging vehicles M1062, M1064 as indicated by the arrows 1061, 1063, 1065, 1067, 1069, 1071, 1073 in FIG. 10B. In this example, the merging vehicle M1066 is in the lane 1059 while its reference vehicle M1064 is in the lane 1058 of the entrance ramp segment 1054. As depicted in FIG. 10B, the simulated position of the reference vehicle M1064 in the lane 1059 is illustrated with the virtual representation V1084. Similarly, the freeway vehicle F1078 is in the lane 1056 of the freeway segment 1052 while its reference vehicle M1066 is in the lane 1059 of the entrance ramp segment 1054. As depicted in FIG. 10B, the simulated position of the reference vehicle M1066 in the lane 1056 is illustrated with the virtual representation V1086.

Referring back to FIG. 5, once the merging plan processor 204 determines the simulated position of the reference vehicle corresponding to the merging vehicle, the virtual assistance information renderer 208 may render merging assistance information to the driver of the merging vehicle based on the simulated position of the reference vehicle in the second lane. In some embodiments, the merging assistance information may facilitate the driver of the merging vehicle in performing the merging process of the merging vehicle. The merging assistance information may include one or more of a virtual target, a safety information indicator, a virtual position indicator, etc., rendered in the field of view of the driver of the merging vehicle in a perceptive and practical manner. Other types of merging assistance information are also possible and contemplated.

In block 504, the virtual assistance information renderer 208 may overlay a virtual target in the field of view of the driver of the merging vehicle based on the simulated position of the reference vehicle via a display device. As discussed elsewhere herein, the field of view of the driver may reflect the area of the roadway environment that the driver observes.

The display device may comprise any suitable device that may present information to the driver in conjunction with the driver's view of the roadway. In some embodiments, the display device may be integrated into existing components of the vehicle, such as transparent and/or reflective mediums of the vehicle like the windows of the vehicle, the mirrors of the vehicle, etc. The display device may project the virtual content onto these surfaces of the vehicle platform 103. Thus, as the driver sees through or looks at these surfaces of the vehicle platform 103, the driver can see the roadway environment together with the virtual content projected onto these surfaces.

In some embodiments, the display device may comprise a transparent panel that overlays the driver's field of view and displays information. In some embodiments, the display device may comprise a projection device configured to project information on any suitable existing surface of the vehicle, such as those within the driver's view of the roadway (e.g., the windscreen). As further non-limiting examples, the display device may comprise a head-up display unit, a wearable device worn by the driver (e.g., augmented reality headset, smart glasses, etc.), a projector, etc. In some embodiments, the display device may record video images and/or still images that depict the roadway environment from the perspective of the driver, superimpose the virtual content on the recorded images to generate augmented images, and render the augmented images on the wearable device in real-time. Other embodiments are also possible and contemplated.

The information presented by the display device may integrate virtual content into the actual field of view of the roadway. In some embodiments, the virtual content may include graphical object(s) and/or textual object(s), such as pictures, text, symbols object(s), etc. The driver may view the roadway using the display medium of the display device while also seeing the virtual content overlaid within the driver's field of view, thus providing an augmenting reality of the roadway environment to the driver.

Figure 7:
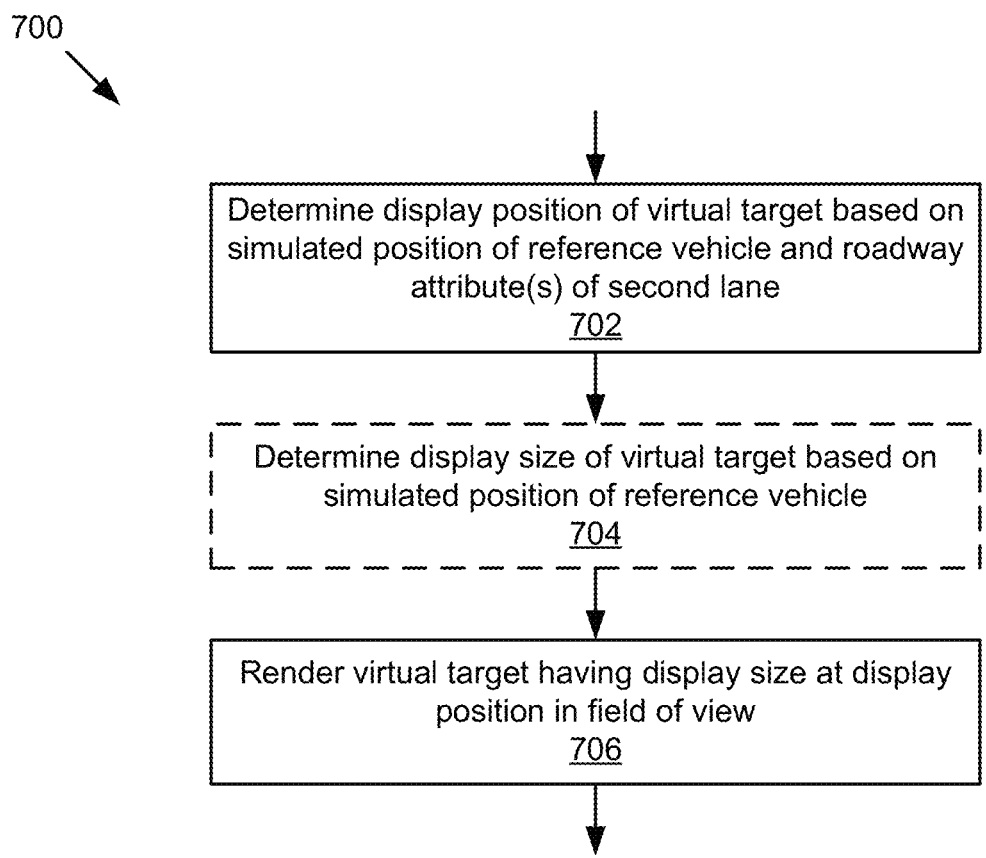
FIG. 7 is a flowchart of an example method for overlaying a virtual target in a field of view of the driver.

FIG. 7 is a flowchart of an example method 700 for overlaying the virtual target in the field of view of the driver. In some embodiments, the virtual assistance information renderer 208 may perform the method 700 to render the virtual target in the field of view of the driver of the merging vehicle via the display device. In block 702, the virtual assistance information renderer 208 may determine the display position of the virtual target in the field of view of the driver of the merging vehicle based on the simulated position of the reference vehicle corresponding to the merging vehicle and the roadway attributes of the second lane. As discussed elsewhere herein, the roadway attributes of the second lane may include the road curvature, the road grade, etc., of the second lane.

In some embodiments, to determine the display position of the virtual target in the field of view of the driver of the merging vehicle, the virtual assistance information renderer 208 may determine the coordinates (x, y) of the display position in a coordinate system associated with the field of view. For example, the coordinate system may have a predefined point of origin located on the windshield of the merging vehicle or on the transparent display of the display device that reflects the field of view or a portion of the field of view of the driver of the merging vehicle. In some embodiments, the virtual assistance information renderer 208 may compute the distance between the simulated position of the reference vehicle in the second lane and the vehicle position of the merging vehicle in the second lane, and determine the y-coordinate of the display position to be directly proportional to the distance. In some embodiments, the virtual assistance information renderer 208 may also determine the y-coordinate of the display position to be directly proportional to the road grade of the second lane (e.g., 35°). In some embodiments, the virtual assistance information renderer 208 may determine the x-coordinate of the display position to be inversely proportional to the road curvature of the second lane (e.g., 15°). Other implementations for determining the display position are also possible and contemplated.

In block 704, the virtual assistance information renderer 208 may optionally determine the display size of the virtual target in the field of view based on the simulated position of the reference vehicle in the second lane. In some embodiments, the display size of the virtual target may be inversely proportional to one or more relative characteristics of the respective vehicles, such as the distance, speed, acceleration deceleration, etc., between the simulated position of the reference vehicle in the second lane and the vehicle position of the merging vehicle in the second lane. In some embodiments, the virtual assistance information renderer 208 may also determine the appearance features of the virtual target (e.g., vehicle type, color, etc.) based on the appearance data received from the reference vehicle. This implementation is particularly advantageous because it allows the virtual target to be rendered with appearance features similar to the visual appearance of the reference vehicle, thereby assisting the driver of the merging vehicle to quickly recognize the reference vehicle in the first lane to merge with as the merging vehicle closely approaches the merging point between the first lane and the second lane.

In block 706, the virtual assistance information renderer 208 may render the virtual target at the display position in the field of view of the driver of the merging vehicle. For example, the virtual assistance information renderer 208 may overlay the virtual target having the display size and the appearance features at the display position on the transparent display of the display device that reflects a portion of the field of view. As discussed above, the display position and/or the display size of the virtual target may be determined based on the simulated position of the reference vehicle corresponding to the merging vehicle and the roadway attributes of the second lane. Thus, the virtual target may illustrate the reference vehicle in the field of view of the driver of the merging vehicle as if the reference vehicle is traveling in the second lane and observed by the driver of the merging vehicle, while the reference vehicle is in fact physically traveling in the first lane. As the virtual target may indicate the simulated position of the reference vehicle ahead of the merging vehicle in the second lane, the driver of the merging vehicle may adjust the vehicle movement of the merging vehicle (e.g., the vehicle speed, the acceleration/deceleration rate, etc.) according to the simulated position of the reference vehicle indicated by the virtual target even before the driver of the merging vehicle can see the reference vehicle traveling in the first lane. As a result, when the merging vehicle reaches the merging point consecutively subsequent to the reference vehicle, the merging vehicle is ready to smoothly merge with the reference vehicle in the first lane due to the prior vehicle adjustment.

Figure 11A:
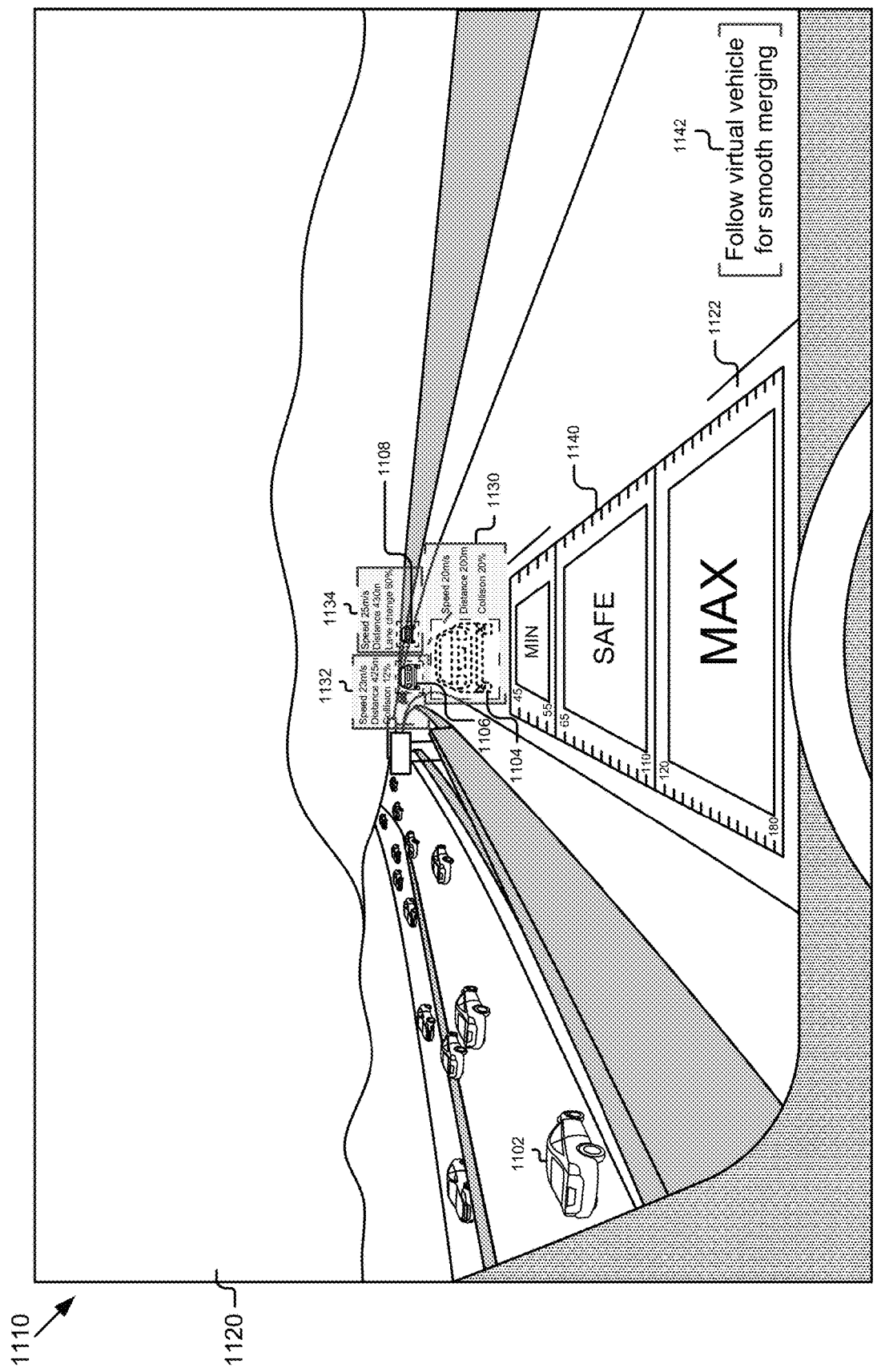
FIG. 11A illustrates an example front field of view associated with the driver with augmented reality assistance information incorporated into the forward field of view.

FIG. 11A illustrates an example field of view of a driver of a merging vehicle with augmented reality assistance information incorporated into the forward field of view. As depicted in FIG. 11A, the field of view 1100 may be a front field of view reflecting the area of the roadway environment that the driver observes when looking ahead. The field of view 1100 may be reflected on a front display surface 1120 covering a portion of the windshield of the merging vehicle that is within the front field of view. In this example, the merging vehicle may travel in the lane 1122 on the entrance ramp segment while the reference vehicle 1102 corresponding to the merging vehicle may travel in the ramp adjacent lane on the freeway segment. As depicted in FIG. 11A, the virtual assistance information renderer 208 may render a virtual target 1104 illustrating the reference vehicle 1102 on the front display surface 1120, thereby overlaying the virtual target 1104 in the field of view 1100. Thus, as the driver of the merging vehicle looks ahead through the windshield, the driver of the merging vehicle can see the virtual target 1104 illustrating the reference vehicle 1102 in the field of view 1100 as if the reference vehicle 1102 is traveling in front of the merging vehicle in the lane 1122 at the simulated position of the reference vehicle 1102. Therefore, the driver of the merging vehicle may adjust the vehicle movement of the merging vehicle according to the simulated position of the reference vehicle 1102 indicated by the virtual target 1104.

Referring back to FIG. 5, in block 506, the merging plan processor 204 may optionally determine a position range for positioning the merging vehicle in the second lane based on the simulated position of the reference vehicle in the second lane indicated by the virtual target. In some embodiments, the position range may include a minimum (min) region, a safe region, and a max region. Each region may be a portion of the second lane located behind the simulated position of the reference vehicle. In some embodiments, the min region may specify a portion of the second lane that satisfies a minimal threshold distance to the simulated position of the reference vehicle (e.g., [40 m, 60 m]). The merging vehicle should not be ahead of the min region to avoid a potential collision with the reference vehicle when the merging vehicle merges with the reference vehicle in the first lane. In some embodiments, the safe region may specify a portion of the second lane that satisfies a safe threshold distance to the simulated position of the reference vehicle (e.g., [60 m, 115 m]). The merging vehicle should maintain its position within the safe region to smoothly merge with the reference vehicle in the first lane as the merging vehicle reaches the merging point. In some embodiments, the max region may specify a portion of the second lane that satisfies a maximal threshold distance to the simulated position of the reference vehicle (e.g., [115 m, 185 m]). The merging vehicle should not be behind the max region so that other vehicles may not arrive at the merging point between the merging vehicle and the reference vehicle, thereby avoiding the need to abruptly change the merging plan of the merging vehicle to adapt accordingly.

In block 508, the virtual assistance information renderer 208 may optionally overlay a virtual position indicator indicating the position range for the merging vehicle in the field of view of the driver of the merging vehicle. For example, as depicted in FIG. 11A, the virtual assistance information renderer 208 may render the virtual position indicator 1140 in the field of view 1100 of the driver of the merging vehicle. As shown, the virtual position indicator 1140 may be rendered relative to the virtual target 1104 on the front display surface 1120 and may indicate the min region, the safe region, the max region of the position range that are located behind the simulated position of the reference vehicle indicated by the virtual target 1104. In some embodiments, the virtual assistance information renderer 208 may also render a merging instruction 1142 in the field of view 1100 instructing the driver of the merging vehicle to follow the virtual target 1104 to smoothly perform the merging process. To follow the virtual target 1104, the driver of the merging vehicle may position the merging vehicle in the lane 1122 according to the regions indicated by the virtual position indicator 1140, thereby maintaining an appropriate following distance to the simulated position of the reference vehicle 1102 indicated by the virtual target 1104. As the merging vehicle maintains an appropriate following distance to the simulated position of the reference vehicle, the merging vehicle can smoothly merge with the reference vehicle as the merging vehicle reaches the merging point.

In some embodiments, the safety factor processor 206 may optionally determine one or more safety factors associated with the reference vehicle, the safety factors may describe the risk of a traffic accident between the merging vehicle and the reference vehicle corresponding to the merging vehicle. In some embodiments, the safety factor processor 206 may extract the vehicle dynamics (e.g., speed, acceleration, deceleration, turning, etc.) of the reference vehicle in the first lane from the vehicle movement data received from the reference vehicle (e.g., 20 m/s), compute the distance between the simulated position of the reference vehicle in the second lane and the vehicle position of the merging vehicle in the second lane (e.g., 200 m), determine the collision metric indicating the estimated collision probability between the merging vehicle and the reference vehicle as the merging vehicle merges with the reference vehicle in the first lane, etc. In some embodiments, to determine the collision metric, the safety factor processor 206 may determine the travel time for the merging vehicle to travel the distance between the simulated position of the reference vehicle and the vehicle position of the merging vehicle in the second lane using the longitudinal speed of the merging vehicle (e.g., 4s), and determine the collision metric corresponding to the travel time (e.g., 20%). Other safety factors associated with the reference vehicle are also possible and contemplated.

In some embodiments, the virtual assistance information renderer 208 may optionally overlay a safety information indicator that indicates the safety factors associated with the reference vehicle in the field of view of the driver of the merging vehicle. For example, as depicted in FIG. 11A, the virtual assistance information renderer 208 may render the safety information indicator 1130 in the field of view 1100 of the driver of the merging vehicle. As shown, the safety information indicator 1130 may be rendered in association with the virtual target 1104 illustrating the reference vehicle 1102 on the front display surface 1120, and thus informing the driver of the merging vehicle about the safety factors associated with the reference vehicle 1102 (e.g., the vehicle speed of the reference vehicle, the distance between the merging vehicle and the simulated position of the reference vehicle, the collision metric between the merging vehicle and the reference vehicle, etc.).

In some embodiments, in addition to the merging assistance information that assists the driver of the merging vehicle to perform the merging process as discussed above, the virtual assistance information renderer 208 may also render hazard assistance information to the driver of the merging vehicle. In some embodiments, the hazard assistance information may assist the driver of the merging vehicle to identify potential hazards caused by the proximate vehicles to adapt accordingly. In some embodiments, the hazard assistance information may include the safety factors associated with the proximate vehicles located proximate to the merging vehicle, the blind spot status indicating whether the blind spot area of the merging vehicle is occupied (e.g., by roadway objects (e.g., barricades, traffic cones, etc.) and/or proximate vehicles), etc. Other types of hazard assistance information are also possible and contemplated.

In some embodiments, the safety factor processor 206 may analyze the sensor data collected by the sensors 113 of the merging vehicle, and determine the hazard assistance information for the merging vehicle based on the sensor data. For example, the safety factor processor 206 may analyze the sensor data collected by the blind spot sensors and determine the blind spot status of the merging vehicle. In some embodiments, the safety factor processor 206 may analyze the sensor data collected by various sensors 113 (e.g., image sensors, proximity sensors, speed sensors, etc.), and determine one or more proximate vehicles and their vehicle movement data based on the sensor data. For example, the safety factor processor 206 may determine the proximate vehicles located within a threshold proximate distance to the merging vehicle (e.g., 500 m), and determine the longitudinal position and the lateral position, the longitudinal speed and the lateral speed, the longitudinal acceleration/deceleration rate and the lateral acceleration/deceleration rate, etc., of these proximate vehicles based on the sensor data.

In some embodiments, for a first proximate vehicle among the proximate vehicles, the safety factor processor 206 may determine the safety factors associated with the first proximate vehicle, the safety factors may describe the risk of a traffic accident between the merging vehicle and the first proximate vehicle. In some embodiments, the safety factor processor 206 may analyze the vehicle movement data of the first proximate vehicle determined from the sensor data as discussed above, and determine the vehicle speed of the first proximate vehicle (e.g., 23 m/s), the distance between the longitudinal position of the merging vehicle and the longitudinal position of the first proximate vehicle (e.g., 425 m), the collision metric indicating the estimated collision probability between the merging vehicle and the first proximate vehicle, the lane change probability that the first proximate vehicle may shift from its current lane to the lane of the merging vehicle, etc. In some embodiments, to determine the collision metric, the safety factor processor 206 may determine the travel time $\Delta_{t\_longitudinal}$ for the merging vehicle to travel the distance ahead between the longitudinal position of the merging vehicle and the longitudinal position of the first proximate vehicle using the longitudinal speed of the merging vehicle (e.g., 3 s), and determine the collision metric corresponding to the travel time $\Delta_{t\_longitudinal}$ (e.g., 12%). In some embodiments, if the current lane of the first proximate vehicle is directly adjacent to the lane of the merging vehicle, the safety factor processor 206 may determine the travel time $\Delta_{t\_lateral}$ for the first proximate vehicle to travel the distance between its lateral position and the lane boundary between these two lanes (e.g., 1 s), and determine the lane change probability corresponding to the travel time $\Delta_{t\_lateral}$ (e.g., 60%). Other safety factors associated with the first proximate vehicle are also possible and contemplated.

In some embodiments, the virtual assistance information renderer 208 may optionally overlay one or more safety information indicators that indicate the safety factors associated with one or more proximate vehicles in the field of view of the driver of the merging vehicle. The safety information indicator may be rendered in association with the corresponding proximate vehicle and may indicate one or more of the vehicle speed of the proximate vehicle, the distance between the merging vehicle and the proximate vehicle, the collision metric between the merging vehicle and the proximate vehicle (e.g., if the collision metric satisfies a collision metric threshold, e.g., higher than 50%), the lane change probability of the proximate vehicle (e.g., if the lane change probability satisfies a lane change probability threshold, e.g., higher than 55%), etc. In some embodiments, if the blind spot status indicates that the blind spot area of the merging vehicle is occupied, the virtual assistance information renderer 208 may also overlay a safety information indicator that indicates the blind spot status in the field of view of the driver of the merging vehicle. In some embodiments, the virtual assistance information renderer 208 may render these safety information indicators in the front field of view and/or the side field of view of the driver of the merging vehicle. As discussed elsewhere herein, the front field of view may reflect the area of the roadway environment that the driver observes when looking ahead, and the side field of view may reflect the area of the roadway environment that the driver observes when looking to the side (e.g., left or right).

As an example of the safety information indicator rendered in the front field of view, as depicted in FIG. 11A, the virtual assistance information renderer 208 may overlay the safety information indicator 1132 that indicates the safety factors associated with the proximate vehicle 1106 and the safety information indicator 1134 that indicates the safety factors associated with the proximate vehicle 1108 in the field of view 1100. As shown, the safety information indicator 1132 may be rendered in association with the proximate vehicle 1106, and the safety information indicator 1134 may be rendered in association with the proximate vehicle 1108 on the front display surface 1120 that reflects the front field of view 1100 of the driver of the merging vehicle. In this example, the merging vehicle may travel in the lane 1122 and the proximate vehicle 1108 may travel in front of the merging vehicle in the neighboring lane of the lane 1122. Thus, the safety information indicator 1134 corresponding to the proximate vehicle 1108 may include the lane change probability of the proximate vehicle 1108 (e.g., 60%).

Figure 11B:
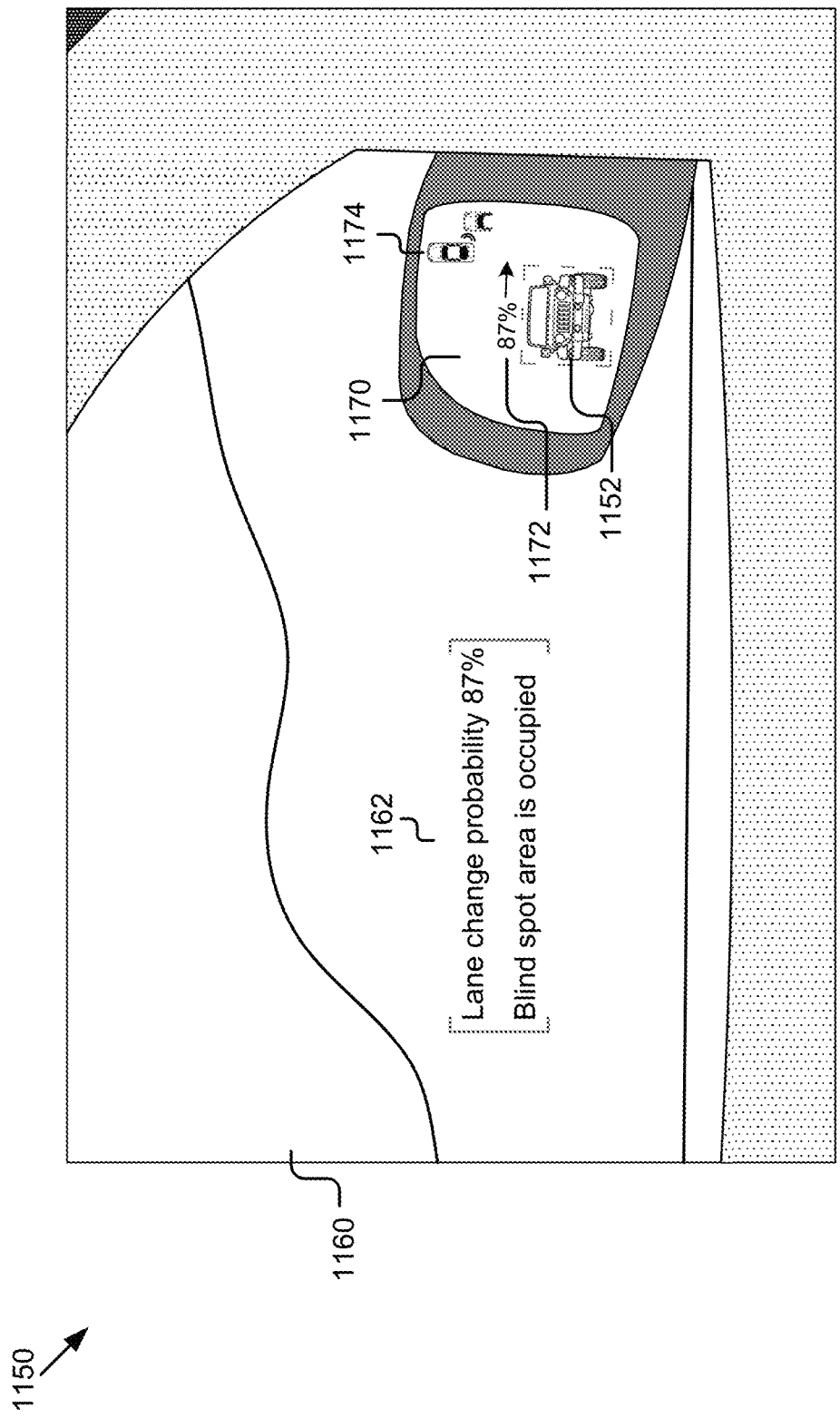
FIG. 11B illustrates an example side field of view associated with the driver with augmented reality assistance information incorporated into the side field of view.

FIG. 11B illustrates another example field of view of a driver of a merging vehicle with augmented reality assistance information incorporated into the field of view. As depicted in FIG. 11B, the field of view 1150 may be a side field of view reflecting the area of the roadway environment that the driver observes when looking to the side. The field of view 1150 may be reflected on a side display surface 1160 covering at least a portion of the side window and/or on a side display surface 1170 covering at least a portion of the side view mirror of the merging vehicle that are within the side field of view.

As an example of the safety information indicator rendered in the side field of view, as depicted in FIG. 11B, the virtual assistance information renderer 208 may overlay the safety information indicators indicating the lane change probability of the proximate vehicle 1152 in the neighboring lane (e.g., 87%) and the blind spot status of the merging vehicle (e.g., blind spot area is occupied) in the field of view 1150. As shown, the virtual assistance information renderer

208 may render the safety information indicator 1162 that indicates the lane change probability and the blind spot status in textual format on the side display surface 1160 incorporated in the side window. The virtual assistance information renderer 208 may also render the safety information indicator 1172 indicating the lane change probability and the safety information indicator 1174 indicating the blind spot status on the side display surface 1170 incorporated in the side view mirror. Thus, as the driver of the merging vehicle looks to the side through the side window or at the side view mirror, the driver may be informed of potential hazards caused by the proximate vehicles and/or the roadway objects, and thus adapting the vehicle movement of the merging vehicle accordingly. In this example, the driver may delay performing a lane change until the blind spot area of the merging vehicle is no longer occupied and/or increase the vehicle speed of the merging vehicle to create sufficient space for the proximate vehicle 1152 in the lane of the merging vehicle.

In some embodiments, one or more vehicle platforms 103 may unexpectedly shift to or depart from the first lane or the second lane, and the vehicle movement data of the vehicle platforms 103 traveling in the first lane and the second lane may change over time. As a result, the merging timestamps and the sequential order in which vehicle platforms 103 traveling in the first lane and the second lane likely arrive at the merging point between the first lane and the second lane may also change, and thus the merging plan of the merging vehicle and the merging assistance information rendered to the driver of the merging vehicle based on the merging plan may need to be updated accordingly.

Figure 8:
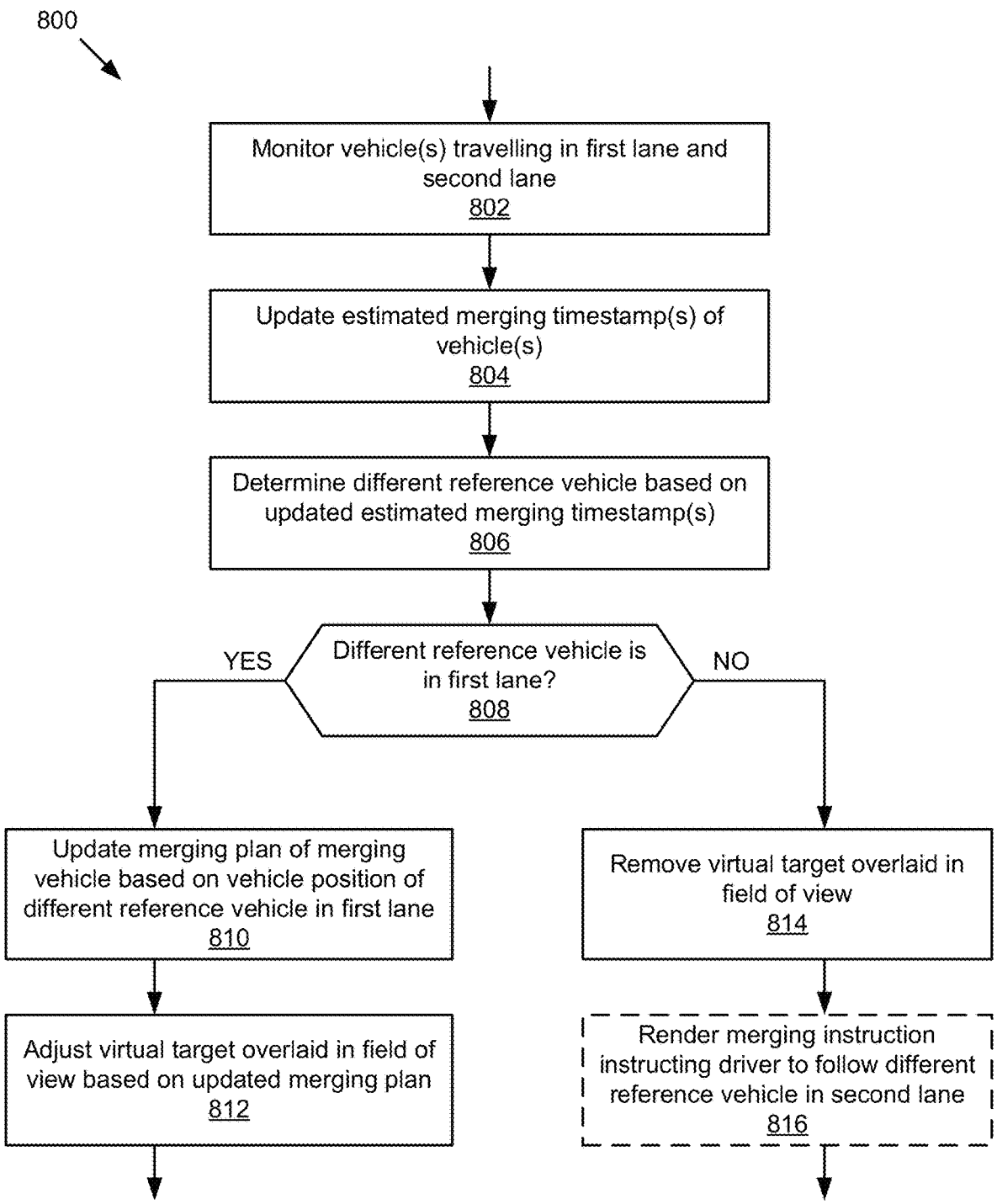
FIG. 8 is a flowchart of an example method for updating the merging plan and updating the merging assistance information rendered to the driver of the merging vehicle.

FIG. 8 is a flowchart of an example method 800 for updating the merging plan of the merging vehicle and updating the merging assistance information rendered to the driver of the merging vehicle. In block 802, the roadside unit 107 may monitor the vehicle platforms 103 traveling in the first lane and the second lane of the merging zone. In some embodiments, the roadside unit 107 may determine the vehicle platforms 103 traveling in the first lane and the second lane at multiple timestamps (e.g., every 1 s, 2 s, etc.), and transmit the vehicle movement data of these vehicle platforms 103 at these timestamps to the reference vehicle processor 202. In some embodiments, the vehicle movement data of a vehicle platform 103 at the most recent timestamp may describe the vehicle movement of the vehicle platform 103 at the most recent timestamp, and may be referred to as the recent vehicle movement data of the vehicle platform 103.

In block 804, the reference vehicle processor 202 may update the estimated merging timestamps at which the vehicle platforms 103 in the first lane and the second lane may arrive at the merging point using the recent vehicle movement data of these vehicle platforms 103. In some embodiments, determining the updated estimated merging timestamps of the vehicle platforms 103 based on their recent vehicle movement data may be performed in a manner similar to determining the estimated merging timestamps of the vehicle platforms 103 as discussed above with reference to block 404 in FIG. 4.

In block 806, the reference vehicle processor 202 may determine a different reference vehicle corresponding to the merging vehicle based on the updated estimated merging timestamps of the vehicle platforms 103. In some embodiments, determining the different reference vehicle corresponding to the merging vehicle may be performed in a manner similar to determining the reference vehicle corresponding to the merging vehicle as discussed above with reference to block 406 in FIG. 4. In some embodiments, the different reference vehicle may likely arrive at the merging point consecutively prior to the merging vehicle given the updated estimated merging timestamps of the vehicle platforms 103. The different reference vehicle may be distinct from the previously determined reference vehicle. For example, as depicted in FIG. 10A, the freeway vehicle F1042 may make a lane change from the freeway lane 1007 to the ramp adjacent lane 1006. In this example, the reference vehicle processor 202 may update the estimated merging timestamps of the vehicle platforms 103 in the ramp adjacent lane 1006 and the freeway entrance lane 1008, and thus determine that the reference vehicle corresponding the merging vehicle M1012 is no longer the freeway vehicle F1020, but changes to the freeway vehicle F1042.

In block 808, the reference vehicle processor 202 may determine whether the different reference vehicle corresponding to the merging vehicle is in the first lane. If in block 808, the reference vehicle processor 202 determines that the different reference vehicle corresponding to the merging vehicle is in the first lane, the method 800 may proceed to block 810. In block 810, the reference vehicle processor 202 may determine that the different reference vehicle corresponding to the merging vehicle is in the first lane while the merging vehicle is in the second lane, and thus determine that the merging plan for the merging vehicle in the second lane is now based on the different reference vehicle in the first lane. The merging plan processor 204 may then update the merging plan for the merging vehicle to merge from the second lane to the first lane based on one or more vehicle characteristics, such as the vehicle position, speed, acceleration, deceleration, turning, etc., of the different reference vehicle in the first lane. In some embodiments, determining the updated merging plan for the merging vehicle based on the vehicle position, speed, acceleration, deceleration, turning, etc., of the different reference vehicle may be performed in a manner similar to determining the merging plan for the merging vehicle based on the vehicle position of the reference vehicle as discussed above with reference to FIGS. 5, 6A, and 6B. In block 812, the virtual assistance information renderer 208 may adjust the virtual target overlaid in the field of view of the driver of the merging vehicle based on the updated merging plan. In some embodiments, adjusting the virtual target overlaid in the field of view based on the updated merging plan may be performed in a manner similar to overlaying the virtual target in the field of view based on the merging plan as discussed above with reference to FIGS. 5 and 7.

Continuing the example in FIG. 10A, to determine the updated merging plan for the merging vehicle M1012, the merging plan processor 204 may determine the simulated position of the different reference vehicle F1042 in the freeway entrance lane 1008, and the virtual assistance information renderer 208 may adjust the display position and/or the display size of the virtual target overlaid in the field of view of the driver of the merging vehicle M1012 based on the simulated position of the different reference vehicle F1042, and/or supplemental information about the target such as a negative or positive distance and/or speed metric, etc. Thus, the virtual target in the field of view of the driver of the merging vehicle M1012 may now indicate the simulated position of the different reference vehicle F1042 instead of the simulated position of the reference vehicle F1020, and the driver of the merging vehicle M1012 may adjust the vehicle movement of the merging vehicle M1012 according to the simulated position of the different reference vehicle F1042 indicated by the virtual target. As a result, the merging vehicle M1012 can smoothly merge with the different reference vehicle F1042 (instead of the reference vehicle F1020) as the merging vehicle M1012 arrives at the merging point 1005 consecutively subsequent to the different reference vehicle F1042.

In this example, the virtual assistance information renderer 208 may also adjust the virtual position indicator overlaid in the field of view of the driver of the merging vehicle M1012 based on the simulated position of the different reference vehicle F1042, and/or adjust the appearance features and/or measurements of the virtual target (e.g., vehicle type, color, numbers, etc.) based on the appearance data received from the different reference vehicle F1042. For example, the virtual assistance information renderer 208 may determine the distance between the simulated position of the different reference vehicle F1042 and the vehicle position of the merging vehicle M1012, and increase or decrease the display size of the virtual target based on the distance. The virtual assistance information renderer 208 may also adjust the virtual position indicator that indicates the position range for positioning the merging vehicle M1012 based on the simulated position of the different reference vehicle F1042. The virtual assistance information renderer 208 may also modify the appearance features of the virtual target based on the appearance data of the different reference vehicle F1042 (e.g., from a blue sedan to a silver crossover), and update the safety information indicator corresponding to the virtual target to indicate the safety factors associated with the different reference vehicle F1042.

If in block 808, the reference vehicle processor 202 determines that the different reference vehicle corresponding to the merging vehicle is not in the first lane, the method 800 may proceed to block 814. In block 814, the reference vehicle processor 202 may determine that the different reference vehicle corresponding to the merging vehicle and the merging vehicle are both in the second lane. As a result, the driver of the merging vehicle can observe the different reference vehicle in front of the merging vehicle in the second lane, and thus rendering the merging assistance information using a virtual target is unnecessary. The virtual assistance information renderer 208 may then remove the virtual target overlaid in the field of view of the driver of the merging vehicle. In block 816, the virtual assistance information renderer 208 may optionally render a merging instruction instructing the driver of the merging vehicle to follow the different reference vehicle ahead of the merging vehicle in the second lane to merge from the second lane to the first lane.

In some embodiments, even if the reference vehicle corresponding to the merging vehicle remains to be the same vehicle, the vehicle movement data of the reference vehicle may change over time. Thus, to adaptively adjust to the changes in the vehicle movement data of the reference vehicle, the merging plan processor 204 may update the merging plan of the merging vehicle at a predefined interval (e.g., every 1 s) using the recent vehicle movement data of the reference vehicle. In some embodiments, the merging plan processor 204 may re-compute the simulated position of the reference vehicle in the second lane based on the recent vehicle movement data of the reference vehicle and the merging vehicle. The virtual assistance information renderer 208 may then adjust the merging assistance information overlaid in the field of view of the driver of the merging vehicle (e.g., the virtual target, the virtual position indicator, etc.) based on the recomputed simulated position of the reference vehicle in the second lane. The safety factor processor 206 may also re-compute the safety factors associated with the reference vehicle based on the recent vehicle movement data of the reference vehicle, and the virtual assistance information renderer 208 may then update the safety information indicator corresponding to the virtual target in the field of view of the driver of the merging vehicle accordingly.

Thus, as discussed above, the present technology can advantageously overlay the merging assistance information in the field of view of the driver of the merging vehicle to assist the driver of the merging vehicle in the second lane to smoothly merge from the second lane to the first lane. It should be understood that the present technology is also applicable in a similar manner to overlay the merging assistance information in the field of view of the driver of the mainstream vehicle to assist the driver of the mainstream vehicle in the first lane to smoothly merge with the merging vehicle as the merging vehicle merges into the first lane. Similar to the merging assistance information rendered to the driver of the merging vehicle, the merging assistance information rendered to the driver of the mainstream vehicle may also include one or more of a virtual target, a safety information indicator, a virtual position indicator, etc., overlaid in the field of view of the driver of the mainstream vehicle. In some embodiments, the mainstream vehicle in the first lane may or may not itself be a reference vehicle corresponding to another merging vehicle in the second lane.

In some embodiments, to overlay the merging assistance information in the field of view of the driver of the mainstream vehicle, the reference vehicle processor 202 may determine a reference vehicle corresponding to the mainstream vehicle. In some embodiments, determining the reference vehicle corresponding to the mainstream vehicle may be performed in a manner similar to determining the reference vehicle corresponding to the merging vehicle as discussed above with reference to FIG. 4. In particular, the reference vehicle processor 202 may estimate one or more merging timestamps at which one or more vehicle platforms 103 traveling in the first lane and the second lane may arrive at the merging point between the first lane and the second lane, and determine the reference vehicle corresponding to the mainstream vehicle based on the estimated merging timestamp of the mainstream vehicle among the one or more merging timestamps.

In some embodiments, the reference vehicle corresponding to the mainstream vehicle may be the vehicle that likely arrives at the merging point consecutively prior to the mainstream vehicle. If the reference vehicle corresponding to the mainstream vehicle is in the second lane (e.g., a merging vehicle) while the mainstream vehicle is in the first lane, the reference vehicle processor 202 may determine that the merging plan for the mainstream vehicle in the first lane is based on the reference vehicle in the second lane, and the merging assistance information using a virtual target may be rendered to the driver of the mainstream vehicle based on the merging plan. As an example, in the merging situation depicted in FIG. 10A, the reference vehicle processor 202 may determine the reference vehicle corresponding to the freeway vehicle F1020 in the ramp adjacent lane 1006 to be the merging vehicle M1010 in the freeway entrance lane 1008. In this example, the freeway vehicle F1020 may itself be the reference vehicle corresponding to the merging vehicle M1012.

In some embodiments, if the reference vehicle corresponding to the mainstream vehicle is in the first lane (e.g., another mainstream vehicle) and the mainstream vehicle is also in the first lane, the driver of the mainstream vehicle can observe the reference vehicle in front of the mainstream vehicle in the first lane, and thus rendering the merging assistance information using a virtual target is unnecessary. Therefore, the virtual assistance information renderer 208 may optionally render a merging instruction instructing the driver of the mainstream vehicle to follow the reference vehicle ahead of the mainstream vehicle in the first lane to proceed past the merging point.

In some embodiments, if the mainstream vehicle is in the first lane and the reference vehicle corresponding to the mainstream vehicle is in the second lane, the merging plan processor 204 may determine the merging plan for the mainstream vehicle to merge with the reference vehicle as the reference vehicle merges into the first lane based on the vehicle position of the reference vehicle in the second lane. In some embodiments, determining the merging plan for the mainstream vehicle may be performed in a manner similar to determining merging plan for the merging vehicle as discussed above with reference to FIGS. 5, 6A, and 6B. In some embodiments, the merging plan processor 204 may determine the simulated position of the reference vehicle in the first lane based on the vehicle position of the reference vehicle in the second lane, the simulated position of the reference vehicle in the first lane may be in front of the vehicle position of the mainstream vehicle in the first lane. Continuing the example in FIG. 10A, the freeway vehicle F1020 is in the ramp adjacent lane 1006 while its reference vehicle M1010 is in the freeway entrance lane 1008. As depicted in FIG. 10A, the simulated position of the reference vehicle M1010 in the ramp adjacent lane 1006 is illustrated with the virtual representation V1030.

In some embodiments, the virtual assistance information renderer 208 may render merging assistance information to the driver of the mainstream vehicle based on the merging plan of the mainstream vehicle. The merging assistance information may include one or more of a virtual target, a safety information indicator, a virtual position indicator, etc., overlaid in the field of view of the driver of the mainstream vehicle via a display device. In some embodiments, rendering the merging assistance information in the field of view of the driver of the mainstream vehicle may be performed in a manner similar to rendering the merging assistance information in the field of view of the driver of the merging vehicle as discussed above with reference to FIGS. 5 and 7.

In some embodiments, to render the merging assistance information in the field of view of the driver of the mainstream vehicle based on the merging plan of the mainstream vehicle, the virtual assistance information renderer 208 may determine the display position and the display size of the virtual target based on the simulated position of the reference vehicle in the first lane and the roadway attributes of the first lane. The virtual assistance information renderer 208 may then overlay the virtual target having the display size at the display position in the field of view of the roadway environment of the driver of the mainstream vehicle. Thus, the virtual target may illustrate the reference vehicle in the field of view of the driver of the mainstream vehicle as if the reference vehicle is traveling in the first lane and observed by the driver of the mainstream vehicle, while the reference vehicle is in fact physically traveling in the second lane. As the virtual target may indicate the simulated position of the reference vehicle ahead of the mainstream vehicle in the first lane, the driver of the mainstream vehicle may adjust the vehicle movement of the mainstream vehicle (e.g., the vehicle speed, the acceleration/deceleration rate, etc.) according to the simulated position of the reference vehicle indicated by the virtual target even before the driver of the merging vehicle can see the reference vehicle traveling in the second lane. As a result of the prior vehicle adjustment, when the mainstream vehicle reaches the merging point consecutively subsequent to the reference vehicle, the mainstream vehicle is ready to smoothly merge with the reference vehicle as the reference vehicle merges into the first lane.

In some embodiments, the merging plan processor 204 may determine a position range for positioning the mainstream vehicle in the first lane based on the simulated position of the reference vehicle in the first lane indicated by the virtual target. The virtual assistance information renderer 208 may then overlay a virtual position indicator that indicates the position range in the field of view of the driver of the mainstream vehicle. Thus, the driver of the mainstream vehicle may position the mainstream vehicle in the first lane according to the regions indicated by the virtual position indicator (e.g., min region, safe region, max region, negative or positive numbers, etc.), thereby maintaining an appropriate following distance to the simulated position of the reference vehicle indicated by the virtual target. As the mainstream vehicle maintains an appropriate following distance to the simulated position of the reference vehicle in the first lane, the mainstream vehicle can smoothly merge with the reference vehicle as the reference vehicle reaches the merging point and merges into the first lane.

In some embodiments, the safety factor processor 206 may determine the safety factors associated with the reference vehicle, the safety factors may describe the risk of a traffic accident between the mainstream vehicle and the reference vehicle corresponding to the mainstream vehicle as the mainstream vehicle merges with the reference vehicle in the first lane. In some embodiments, the vehicle the virtual assistance information renderer 208 may overlay a safety information indicator in association with the virtual target in the field of view of the driver of the mainstream vehicle, the safety information indicator may indicate the safety factors of the reference vehicle (e.g., the vehicle speed of the reference vehicle, the distance between the merging vehicle and the simulated position of the reference vehicle, the collision metric between the mainstream vehicle and the reference vehicle, etc.).

In some embodiments, the safety factor processor 206 may also determine the safety factors associated with one or more proximate vehicles located proximate to the mainstream vehicle. The safety factor associated with a proximate vehicle may describe the risk of traffic accident between the mainstream vehicle and the proximate vehicle (e.g., the vehicle speed of the proximate vehicle, the distance between the mainstream vehicle and the proximate vehicle, the collision metric between the mainstream vehicle and the proximate vehicle, the lane change probability of the proximate vehicle, etc.). In some embodiments, the virtual assistance information renderer 208 may overlay one or more safety information indicators in the field of view of the driver of the merging vehicle, the safety information indicator may be rendered in association with the corresponding proximate vehicle and may indicate the safety factors of the corresponding proximate vehicle. Similar to the safety information indicators rendered to the driver of the merging vehicle, the virtual assistance information renderer 208 may render these safety information indicators in the front field of view and/or the side field of view of the driver of the mainstream vehicle.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
estimating one or more merging timestamps at which one or more vehicles traveling in one or more lanes will arrive at a conflict zone based on vehicle movement data, the estimated one or more merging timestamps including an estimated merging timestamp for a merging vehicle in a second lane and a plurality of estimated merging timestamps for a plurality of vehicles traveling in a first lane;
determining a reference vehicle traveling in the first lane from among the plurality of vehicles based on the estimated merging timestamp of the merging vehicle and the plurality of merging timestamps for the plurality of vehicles, the first lane merging with the second lane at the conflict zone, the one or more lanes including the first lane and the second lane;
determining a merging plan for the merging vehicle traveling in the second lane to merge into the first lane based on a vehicle position of the reference vehicle in the first lane, the merging plan including a calculated position of the reference vehicle in the second lane based on the estimated merging timestamp of the reference vehicle in the first lane; and
outputting, via a display device, a merging instruction indicating the merging plan of the merging vehicle including displaying a graphical representation of the reference vehicle at a graphical location corresponding to the calculated position in the second lane and between the merging vehicle and the conflict zone.

2. The method of claim 1, further comprising:
monitoring the one or more vehicles traveling in the one or more lanes;
updating the one or more merging timestamps of the one or more vehicles; and
selecting a different reference vehicle based on the updated one or more merging timestamps, the different reference vehicle being separate from the reference vehicle.

3. The method of claim 2, further comprising:
responsive to selecting the different reference vehicle, updating the merging plan of the merging vehicle based on the updated one or more merging timestamps; and
updating the merging instruction displayed on the display device based on the updated merging plan.

4. The method of claim 3, wherein updating the merging instruction includes:
adjusting a virtual representation overlaid in a field of view of a driver of the merging vehicle to indicate the different reference vehicle.

5. The method of claim 1, wherein outputting the merging instruction via the display device includes:
overlaying, via the display device, a virtual representation of the merging instruction in a field of view of a roadway environment of a driver of the merging vehicle based on the merging plan of the merging vehicle.

6. The method of claim 1, further comprising:
receiving the vehicle movement data from the one or more vehicles traveling in one or more of the first lane and the second lane, the one or more vehicles including the merging vehicle.

7. The method of claim 1, further comprising:
determining a lane in which the reference vehicle is traveling based on the vehicle movement data of the one or more vehicles; and
outputting via the display device, the merging instruction indicating the merging plan of the merging vehicle based on the determined lane and the determined reference vehicle.

8. The method of claim 1, further comprising:
determining a projected distance of the reference vehicle ahead of the merging vehicle at the estimated merging timestamp of the merging vehicle; and
outputting on the display device, a virtual representation of the reference vehicle including simulating the projected distance of the reference vehicle in the second lane ahead of the merging vehicle.

9. A system comprising:
one or more processors; and
one or more memories storing instructions that, when executed by the one or more processors, cause the system to:
estimate one or more merging timestamps at which one or more vehicles traveling in one or more lanes will arrive at a conflict zone based on vehicle movement data, the estimated one or more merging timestamps including an estimated merging timestamp for a merging vehicle in a second lane and a plurality of estimated merging timestamps for a plurality of vehicles traveling in a first lane;
determine a reference vehicle traveling in the first lane from among the plurality of vehicles based on the estimated merging timestamp of the merging vehicle and the plurality of merging timestamps for the plurality of vehicles, the first lane merging with the second lane at the conflict zone, the one or more lanes including the first lane and the second lane;
determine a merging plan for the merging vehicle traveling in the second lane to merge into the first lane based on a vehicle position of the reference vehicle in the first lane, the vehicle position of the reference vehicle being associated with an estimated merging timestamp of the reference vehicle, the merging plan including a calculated position of the reference vehicle in the second lane based on the estimated merging timestamp of the reference vehicle in the first lane; and
output, via a display device, a merging instruction indicating the merging plan of the merging vehicle including displaying a graphical representation of the reference vehicle at a graphical location corresponding to the calculated position in the second lane and between the merging vehicle and the conflict zone.

10. The system of claim 9, wherein the instructions further cause the system to:
monitor the one or more vehicles traveling in the one or more lanes;
update the one or more merging timestamps of the one or more vehicles; and
select a different reference vehicle based on the updated one or more merging timestamps, the different reference vehicle being separate from the reference vehicle.

11. The system of claim 10, wherein the instructions further cause the system to:
responsive to selecting the different reference vehicle, update the merging plan of the merging vehicle based on the updated one or more merging timestamps; and update the merging instruction displayed on the display device based on the updated merging plan.

12. The system of claim 11, wherein updating the merging instruction includes:
adjusting a virtual representation overlaid in a field of view of a driver of the merging vehicle to indicate the different reference vehicle.

13. The system of claim 9, wherein outputting the merging instruction via the display device includes:
overlaying, via the display device, a virtual representation of the merging instruction in a field of view of a roadway environment of a driver of the merging vehicle based on the merging plan of the merging vehicle.

14. The system of claim 9, wherein the instructions further cause the system to:
receive the vehicle movement data from the one or more vehicles traveling in one or more of the first lane and the second lane, the one or more vehicles including the merging vehicle.

15. The system of claim 9, wherein the instructions further cause the system to:
determine a lane in which the reference vehicle is traveling based on the vehicle movement data of the one or more vehicles; and
output via the display device, the merging instruction indicating the merging plan of the merging vehicle based on the determined lane and the determined reference vehicle.

16. The system of claim 9, wherein the instructions further cause the system to:
determine a projected distance of the reference vehicle ahead of the merging vehicle at the estimated merging timestamp of the merging vehicle; and
output on the display device, a virtual representation of the reference vehicle including simulating the projected distance of the reference vehicle in the second lane ahead of the merging vehicle.

17. A system comprising:
one or more processors;
one or more display devices including one of a heads-up display unit, smart glasses, and a headset; and
one or more memories storing instructions that, when executed by the one or more processors, cause the system to:
receive vehicle movement data from one or more vehicles traveling in one or more lanes;
estimate one or more merging timestamps at which the one or more vehicles traveling in the one or more lanes will arrive at a conflict zone based on the vehicle movement data, the estimated one or more merging timestamps including an estimated merging timestamp for a merging vehicle in a second lane and a plurality of estimated merging timestamps for a plurality of vehicles traveling in a first lane;
determine a reference vehicle traveling in the first lane from among the plurality of vehicles based on the estimated merging timestamp of the merging vehicle and the plurality of merging timestamps for the plurality of vehicles, the first lane merging with the second lane at the conflict zone, the one or more lanes including the first lane and the second lane;
determine a merging plan for the merging vehicle traveling in the second lane to merge into the first lane based on a vehicle position of the reference vehicle in the first lane, the merging plan including a calculated position of the reference vehicle in the second lane based on the estimated merging timestamp of the reference vehicle in the first lane; and
overlaying, via the one or more display devices, a virtual representation in a field of view of a roadway environment of a driver of the merging vehicle based on the merging plan of the merging vehicle including displaying a graphical representation of the reference vehicle at a graphical location corresponding to the calculated position in the second lane and between the merging vehicle and the conflict zone.

18. The system of claim 17, wherein the instructions further cause the system to:
monitor the one or more vehicles traveling in the one or more lanes;
update the one or more merging timestamps of the one or more vehicles; and
select a different reference vehicle based on the updated one or more merging timestamps, the different reference vehicle being separate from the reference vehicle.

19. The system of claim 18, wherein the instructions further cause the system to:
responsive to selecting the different reference vehicle, update the merging plan of the merging vehicle based on the updated one or more merging timestamps; and
update the virtual representation displayed on the one or more display devices based on the updated merging plan.

20. The system of claim 19, wherein updating the virtual representation includes:
adjusting the virtual representation overlaid in the field of view of the driver of the merging vehicle to indicate the different reference vehicle.

* * * * *